(12) United States Patent
Ohshima et al.

(10) Patent No.: US 8,553,436 B2
(45) Date of Patent: Oct. 8, 2013

(54) SYNCHRONIZATION DETECTING CIRCUIT AND AUTOMATIC SYNCHRONOUS PARALLELIZATION APPARATUS

(75) Inventors: Masaaki Ohshima, Tokyo (JP); Shuichi Ushiki, Tokyo (JP); Jinbin Zhao, Tokyo (JP)

(73) Assignee: Origin Electric Company, Limited (JP)

( * ) Notice: Subject to any disclaimer, the term of this patent is extended or adjusted under 35 U.S.C. 154(b) by 294 days.

(21) Appl. No.: 13/006,636

(22) Filed: Jan. 14, 2011

(65) Prior Publication Data
US 2011/0182091 A1   Jul. 28, 2011

(30) Foreign Application Priority Data

Jan. 25, 2010 (JP) ................................. 2010-013527
Mar. 8, 2010 (JP) ................................. 2010-050751

(51) Int. Cl.
*H02M 7/5395* (2006.01)

(52) U.S. Cl.
USPC .......................................................... 363/41

(58) Field of Classification Search
USPC ........................................ 323/40–41, 95, 97
See application file for complete search history.

(56) References Cited

U.S. PATENT DOCUMENTS

| | | | |
|---|---|---|---|
| 5,381,328 A * | 1/1995 | Umezawa et al. .............. | 363/41 |
| 5,473,528 A | 12/1995 | Hirata et al. | |
| 2005/0135031 A1 | 6/2005 | Colby et al. .................... | 361/78 |

FOREIGN PATENT DOCUMENTS

| | | |
|---|---|---|
| CN | 1450706 A | 10/2003 |
| CN | 101534065 | 9/2009 |
| JP | 52-40174 | 3/1977 |
| JP | H06189476 A | 7/1994 |
| JP | 9-28040 | 1/1997 |
| JP | 2009-219263 | 9/2009 |

OTHER PUBLICATIONS

Extended European Search Report dated Apr. 26, 2012 for corresponding European Patent Application No. 11152107.6, pp. 1-6 considered.
Office Action dated Apr. 28, 2013 corresponding to Chinese Patent Application No. 201110026452.3 with English Translation, 15 pp.

* cited by examiner

*Primary Examiner* — Harry Behm
(74) *Attorney, Agent, or Firm* — Ohlandt Greeley Ruggiero & Perle L.L.P.

(57) ABSTRACT

An automatic synchronous parallelization apparatus capable of suppressing an inrush current by automatically adjusting the magnitude, the frequency, and the phase of the voltage when a single-phase voltage-type DC-to-AC converting device performing an autonomous parallel operation is connected in parallel with an external single-phase AC voltage source. The automatic synchronous parallelization apparatus includes a synchronization detecting circuit, a voltage amplitude command value generating circuit, and a frequency command value generating circuit. The voltage amplitude command value generating circuit generates the 1st-axis voltage command value, and the frequency command value generating circuit generates the 2nd-axis voltage command value, based on a value relating to a frequency difference between an external single-phase AC voltage source and a single-phase voltage-type DC-to-AC converting device and an effective value of a voltage of the external single-phase AC voltage source that are detected by synchronization detecting circuit. By using such command values, an output of the single-phase voltage-type DC-to-AC converting device can be adjusted to as to coincide with a voltage waveform of the external single-phase AC voltage source.

10 Claims, 9 Drawing Sheets

SYNCHRONIZATION DETECTING CIRCUIT AND AUTOMATIC SYNCHRONOUS PARALLELIZATION APPARATUS

CROSS-REFERENCED APPLICATIONS

This application claims priority to Japanese Patent Application Nos. 2010-013527, filed on Jan. 25, 2010, and 2010-050751, filed on Mar. 8, 2010, both of which are incorporated herein in their entirety.

BACKGROUND

1. Field of the Disclosure

The present disclosure relates to a synchronization detecting circuit that detects a voltage amplitude of a single-phase AC voltage source as a synchronization target and a frequency difference and a phase difference between the single-phase AC voltage source and a voltage source on the synchronization detecting circuit side. In addition, the present disclosure relates to an automatic synchronous parallelization apparatus that adjusts a voltage amplitude, a frequency, and a phase of a single-phase voltage-type DC-to-AC converting device performing an autonomous parallel operation.

2. Discussion of the Background Art

In order to synchronize two single-phase AC voltage sources, the voltage amplitude of a single-phase AC voltage source as a synchronization target and the frequency difference and the phase difference between the two single-phase AC voltage sources need to be detected. A technology, which is shown in FIG. 4, for detecting these is known.

According this technology, for each signal-phase AC voltage source, a voltage is sampled for each predetermined period, and a change amount per one sample (corresponding to a differential value) and a change in the change amount (corresponding to a second-order differential) per one sample are calculated. Then, based on the derived values, the voltage amplitude, the frequency, and the phase are acquired, and then, differences thereof are calculated (for example, see Japanese Patent Application Laid-Open (JP-A) No. 52-40174).

In addition, a technology for suppressing an inrush current at the time of connecting an inverter in parallel with a power system is known (for example, see JP-A No. 09-028040). In JP-A No. 09-028040, a technology is disclosed in which a filter capacitor of an inverter is charged with a current having a phase led by 90 degrees from a voltage of the power system, and the inverter is connected in parallel with the power system after the voltage of the filter capacitor becomes the same as that of the power system.

Furthermore, a single-phase voltage-type DC-to-AC converting device that performs an autonomous parallel operation by being connected in parallel with a single-phase voltage source such as a power system or a generator is known (for example, see JP-A No. 2009-219263). In JP-A No. 2009-219263, a single-phase voltage-type DC-to-AC converting device that is operated by being coupled with an external single-phase AC voltage source by generating a single-phase AC voltage having a predetermined phase difference from the phase of the external single-phase AC voltage source and adjusting the amplitude, the frequency, and the phase of the generated single-phase AC voltage is disclosed.

According to the technology disclosed in JP-A No. 52-40174, a sample voltage value is differentiated, and accordingly, there is a problem in that the influence of harmonic components included in a voltage waveform may be significant. Furthermore, division is used with an AC value being used as a denominator for detection of the frequency, and accordingly, there is a problem of instability in a case where a "division by zero" occurs.

Thus, in order to solve the above-described problem, according to an aspect of the present disclosure, there is provided a synchronization detecting circuit that is not easily influenced by harmonic components and can reliably maintain stability.

A single-phase voltage-type DC-to-AC converting device performing an autonomous parallel operation is controlled to be a voltage source when viewed from the side of the single-phase voltage source such as a power system or a generator. In a case where a single-phase voltage-type DC-to-AC converting device performing an autonomous parallel operation is connected in parallel with the external single-phase AC voltage source, in order to suppress an inrush current, the output of the single-phase voltage-type DC-to-AC converting device needs to follow the frequency and the voltage amplitude of the single-phase voltage source that consistently change. However, according to the technology of JP-A No. 52-40174, the inverter is controlled to be a current source, and accordingly, the technology cannot be applied to a single-phase voltage-type DC-to-AC converting device that is controlled to be a voltage source. As above, there is a problem in that there is no technology for automatic synchronous parallelization performed by suppressing an inrush current by allowing the output of the single-phase voltage-type DC-to-AC converting device performing an autonomous parallel operation to follow the frequency and the voltage amplitude of the single-phase voltage source that consistently change.

In order to solve the above-described problem, according to another aspect of the present disclosure, there is provided an automatic synchronous parallelization device capable of suppressing an inrush current by automatically adjusting the magnitude, the frequency, and the phase of the voltage when a single-phase voltage-type DC-to-AC converting device performing an autonomous parallel operation is connected in parallel with an external single-phase AC voltage source.

SUMMARY

According to an aspect of the present disclosure, there is provided a synchronization detecting circuit including: a detection unit that detects a value relating to a frequency difference between an external single-phase AC voltage source that is a parallelization target of a single-phase voltage-type DC-to-AC converting device performing an autonomous parallel operation based on the 1st-axis voltage command value, which is used for adjusting an amplitude of an output single-phase AC voltage, and the 2nd-axis voltage command value, which is used for adjusting a frequency, and the single-phase voltage-type DC-to-AC converting device and a value relating to an effective value of a voltage of the single-phase AC voltage source.

More specifically, a synchronization detecting circuit according to the present disclosure generates a waveform of a delayed voltage acquired by delaying the target voltage waveform by predetermined time using a voltage waveform of an external single-phase AC voltage source as a target and a reference angular frequency $\omega_{co}$ of the synchronization detecting circuit, and calculates the frequency difference cosine signal and the frequency difference sine signal based on the target voltage waveform detected by the sampler and the waveform of a delayed voltage. In the descriptions presented hereinafter, an external single-phase AC voltage source as a target, a single-phase AC voltage of an external single-phase AC voltage source, a single-phase voltage-type DC-to-AC converting device as a target source, and a single-phase AC voltage of the single-phase voltage-type DC-to-AC converting device may be respectively referred to as a "target single-phase AC voltage source," a "target voltage waveform," a "target-source single-phase AC voltage source," and a "target-source voltage waveform."

Specifically, in the synchronization detecting circuit according to the present disclosure, the detection unit includes: a reference angular frequency $\omega_{co}$; a sampler that detects a target voltage waveform of the external single-phase AC voltage source; a delay circuit that generates a waveform of a delayed voltage that is delayed from the target voltage waveform detected by the sampler by time that is longer than $(m-1)\,\pi/\omega_{co}$ and shorter than $m\pi/\omega_{co}$ (here, m is a natural number); and a calculation unit that calculates a frequency difference cosine signal and a frequency difference sine signal that have an angular frequency corresponding to a difference between a target angular frequency of the target voltage waveform and the target-source angular frequency based on the target voltage waveform, which is detected by the sampler, the waveform of the delayed voltage, which is generated by the delay circuit, and the given target-source angular frequency of the single-phase voltage-type DC-to-AC converting device, wherein the value relating to the frequency difference and the value relating to the effective value of the voltage are detected based on the frequency difference cosine signal and the frequency difference sine signal that are calculated by the calculation unit.

In addition, the reference angular frequency $\omega_{co}$ of the synchronization detecting circuit may be the same as the target-source angular frequency w.

The frequency difference cosine signal is a product of the cosine of a phase difference and the amplitude of the target voltage, and the frequency difference sine signal is a product of the sine of a phase difference and the amplitude of the target voltage. By using these two values, the voltage amplitude of the target voltage waveform, a frequency difference between the target-source voltage waveform and the target voltage waveform, and a phase difference between the target-source voltage waveform and the target voltage waveform can be calculated. In the synchronization detecting circuit according to the present disclosure, the synchronization detecting circuit does not directly differentiate the single-phase AC voltage, and accordingly, there is no "division by zero" unless the effective value of the target voltage waveform is zero. Accordingly, a synchronization detecting circuit that is not easily influenced by harmonic components and can reliably maintain stability can be provided.

In the synchronization detecting circuit according to the present disclosure, the delay circuit delays the waveform of the delayed voltage from the target voltage waveform by time of $(m-\frac{1}{2})\,\pi/\omega_{co}$.

In the synchronization detecting circuit according to the present disclosure, the calculation unit performs calculation of Mathematical Expression A1,

[Math A1]

$$\begin{pmatrix} V_3(nTs) \\ V_4(nTs) \end{pmatrix} = \frac{1}{\sqrt{2}} \begin{pmatrix} \sin(n\omega Ts) & (-1)^m \cos(n\omega Ts) \\ \cos(n\omega Ts) & -(-1)^m \sin(n\omega Ts) \end{pmatrix} \begin{pmatrix} V_2(nTs) \\ V_2^{\#}(nTs) \end{pmatrix} \quad (1)$$

wherein $V_2(nTs)$ is the target voltage waveform, $V_2^{\#}(nTs)$ is the waveform of the delayed voltage, $V_3(nTs)$ is the frequency difference cosine signal, $V_4(nTs)$ is the frequency difference sine signal, n is a sampling number of the target voltage waveform detected by the sampler, Ts is a sample period, and $\omega$ is the target-source angular frequency.

The synchronization detecting circuit according to the present disclosure, further preferably includes: a low-pass filter that eliminates high-frequency components of the frequency difference cosine signal and the frequency difference sine signal that are accumulated by the calculation unit.

By eliminating high-frequency components of the frequency difference cosine signal and the frequency difference sine signal, the voltage amplitude of the target-source voltage waveform, the frequency difference between the target-source voltage waveform and the target voltage waveform, and the phase difference between the target-source voltage waveform and the target voltage waveform can be calculated more stably.

The synchronization detecting circuit according to the present disclosure, further can include: a detection unit that detects an effective value of the target voltage waveform as the value relating the effective value of the voltage, a frequency difference between the target angular frequency and the target-source angular frequency as the value relating to the frequency difference, and a phase difference between the target voltage waveform and the target source single-phase AC voltage.

By further including the detection unit, the voltage amplitude of the target voltage waveform, the frequency difference between the test-source voltage waveform and the target voltage waveform, and the phase difference between the test-source voltage waveform and the target voltage waveform can be output.

In synchronization detecting circuit according to the present disclosure, the detection unit can detect the effective value $V_s$ of the voltage, the frequency difference $\omega_s-\omega$, and the phase difference $\phi$ through Mathematical Expressions A2, A3, and A4,

[Math A2]

$$V_s = \sqrt{V_3^2(nTs) + V_4^2(nTs)} \quad (2)$$

wherein, $V_s$ is the effective value of the voltage,

[Math A3]

$$(\omega_s - \omega)V_s^2 = V_3(nTs)\frac{dV_4}{dt}(nTs) - V_4(nTs)\frac{dV_3}{dt}(nTs) \quad (3)$$

wherein, $\omega_s$ is the target angular frequency.

[Math A4]

$$n(\omega_s - \omega)Ts + \phi = \arctan\left(\frac{V_4(nTs)}{V_3(nTs)}\right) \quad (4)$$

In order to achieve the second aspect of the present disclosure, an automatic synchronous parallelization apparatus according to the present disclosure detects the value relating to the frequency difference between the external single-phase AC voltage source and the single-phase voltage-type DC-to-AC converting device and a value relating to the effective value of the voltage of the external single-phase AC voltage source, and controls the single-phase voltage-type DC-to-AC converting device such that the effective value of the voltage becomes close to the effective value of the voltage of the external single-phase AC voltage source, and the frequency is shifted from the frequency of the external single-phase AC voltage source by an arbitrary value.

Specifically, an automatic synchronous parallelization apparatus according to the present disclosure includes: the synchronization detecting circuit; a voltage amplitude command value generating circuit that generates the 1st-axis voltage command value for which the effective value of the single-phase AC voltage of the single-phase voltage-type DC-to-AC converting device approaches an effective value of a voltage of the external single-phase AC voltage source by using the value relating to the effective value of the voltage that is detected by the synchronization detecting circuit and inputs the 1st-axis voltage command value to the single-phase voltage-type DC-to-AC converting device; and a frequency command value generating circuit that generates the 2nd-axis voltage command value for which the frequency of the single-phase AC voltage of the single-phase voltage-type DC-to-AC converting device becomes a frequency that is shifted from the frequency of the external single-phase AC voltage source by an arbitrary frequency by using the value relating to the frequency difference that is detected by the synchronization detecting circuit and inputs the 2nd-axis voltage command value to the single-phase voltage-type DC-to-AC converting device.

Based on the value relating to the frequency difference between the external single-phase AC voltage source and the single-phase voltage-type DC-to-AC converting device and the effective value of the voltage of the external single-phase AC voltage source, which are detected by the synchronization detecting circuit, the voltage command value generating circuit generates the 1st-axis voltage command value, and the frequency command value generating circuit generates the 2nd-axis voltage command value. By using such command values, the output of the single-phase voltage-type DC-to-AC converting device can be adjusted so as to coincide with the voltage waveform of the external single-phase AC voltage source.

Therefore, an automatic synchronous parallelization apparatus according to the present disclosure can suppress an inrush current by automatically controlling the magnitude, the frequency, and the phase of the voltage when the single-phase voltage-type DC-to-AC converting device performing an autonomous parallel operation is connected in parallel with the external single-phase AC voltage source.

In the automatic synchronous parallelization apparatus according to the present disclosure, the voltage amplitude command value generating circuit includes: a voltage system subtractor that subtracts the value relating to the effective value of the voltage of the single-phase AC output by the single-phase voltage-type DC-to-AC converting device from the effective value of the voltage of the external single-phase AC voltage source that is detected by the synchronization detecting circuit; a voltage system integrator that integrates a value acquired through subtraction of the voltage system subtractor; and a voltage system adder that generates the 1st-axis voltage command value by adding an initial value of the single-phase AC voltage of the single-phase voltage-type DC-to-AC converting device prior to start of automatic parallelization control with the external single-phase AC voltage source and the value acquired through integration of the voltage system integrator.

In the automatic synchronous parallelization apparatus according to the present disclosure, the frequency command value generating circuit includes: a frequency system calculator that adds the value relating to the frequency difference detected by the synchronization detecting circuit to a value acquired by multiplying the effective value of the voltage of the external single-phase AC voltage source, which is detected by the synchronization detecting circuit, by the arbitrary frequency value; and a frequency system integrator that integrates a value acquired through calculation of the frequency system calculator; and a frequency system adder that generates the 2nd-axis voltage command value by adding an initial frequency of the single-phase AC voltage of the single-phase voltage-type DC-to-AC converting device prior to start of the automatic parallelization control with the external single-phase AC voltage source and the value acquired through integration of the frequency system integrator.

In the automatic synchronous parallelization apparatus according to the present disclosure, the value relating to the effective value of the voltage is preferably a square of the effective value of the voltage.

In the automatic synchronous parallelization apparatus according to the present disclosure, the synchronization detecting circuit, when the effective value of the voltage and the frequency of the single-phase AC voltage of the single-phase voltage-type DC-to-AC converting device are in predetermined regulated ranges having the effective value of the voltage and the frequency of the single-phase AC voltage source used as centers thereof, has the single-phase voltage-type DC-to-AC converting device and the external single-phase AC voltage source so as to be in parallel with each other.

By limiting the range of the condition for having the single-phase voltage voltage-type DC-to-AC converting device to be in parallel with the external single-phase AC voltage source, overshooting can be avoided.

According to the present disclosure, a synchronization detecting circuit that is not easily influenced by harmonic components and can reliably maintain stability can be provided. In addition, since a synchronization detecting circuit according to the present disclosure samples the target voltage waveform, the synchronization detecting circuit can be easily applied particularly to a case where the target-source single-phase AC voltage source is a digital control power source. Furthermore, in a synchronization detecting circuit according to the present disclosure, as shown in FIG. 4, a detection unit that detects the effective values, the frequencies, and the phases of both the target-source voltage waveform and the target voltage waveform does not need to be provided, and thus, the synchronization detecting circuit can be easily mounted. In addition, by including a low-pass filter in a synchronization detecting circuit according to the present disclosure, the influence of harmonic components can be eliminated, whereby the operation can be stabilized.

According to the present disclosure, there is provided an automatic synchronous parallelization apparatus capable of suppressing an inrush current by automatically controlling the magnitude, the frequency, and the phase of the voltage when a single-phase voltage-type DC-to-AC converting device performing an autonomous parallel operation is connected in parallel with an external single-phase AC voltage source.

DETAILED DESCRIPTION OF THE PREFERRED EMBODIMENT

Figure 1:
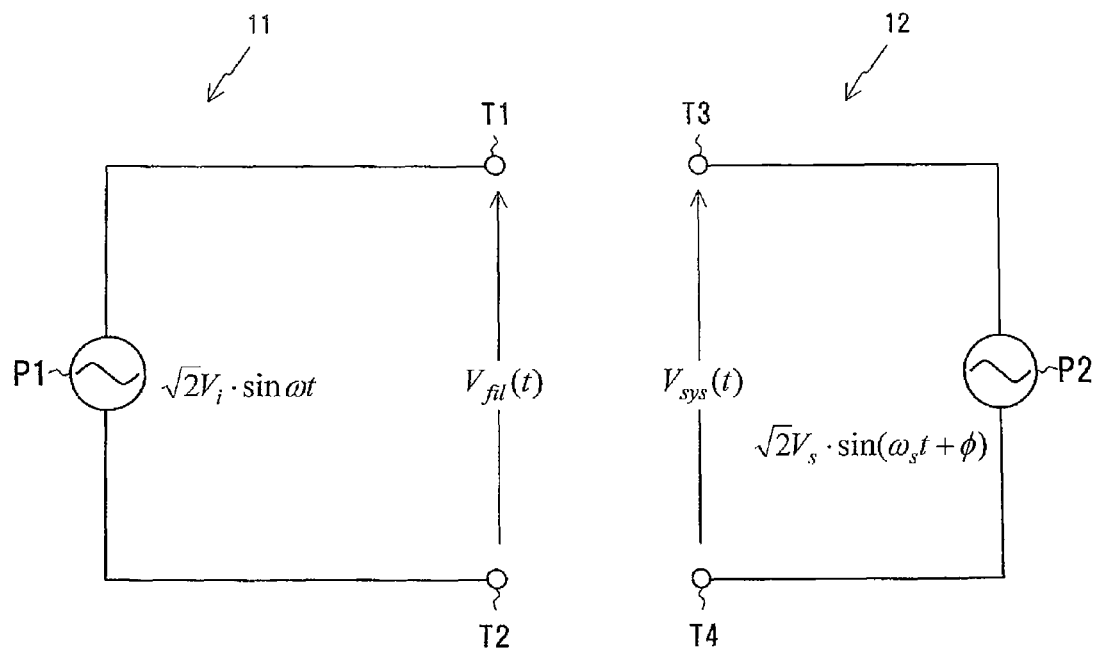
FIG. 1 is a schematic diagram illustrating a synchronization test performed between a target-source single-phase AC voltage source and a target AC voltage source.

An embodiment of the present disclosure will be described with reference to the accompanying drawings. The embodiment described below is an example of the present disclosure, and the present disclosure is not limited thereto. Like reference numerals in the drawings denote like elements in the descriptions and the drawings.

Figure 5:
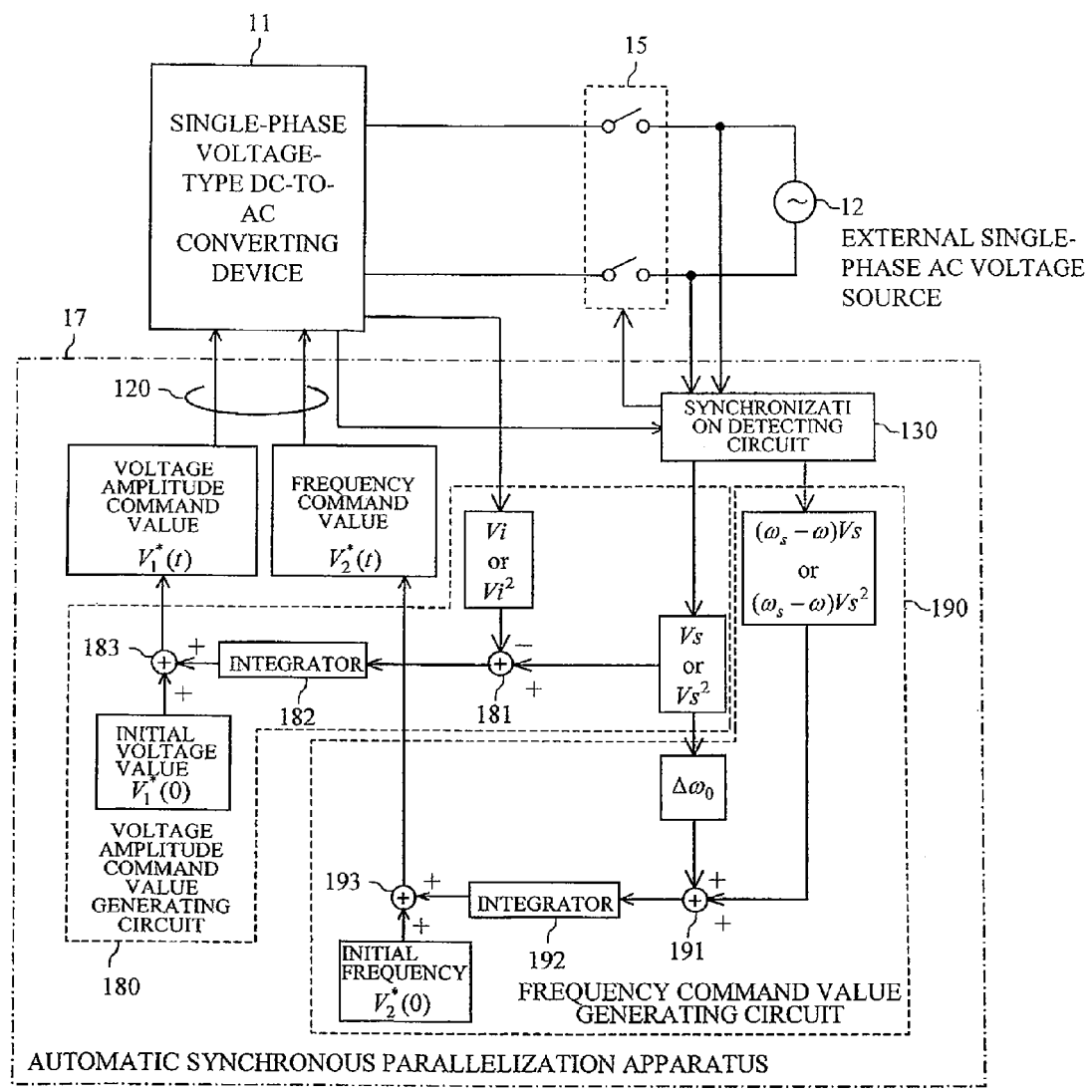
FIG. 5 is a block diagram illustrating an automatic synchronous parallelization apparatus according to the present disclosure.

FIG. 5 is a block diagram illustrating an automatic synchronous parallelization apparatus 17 according to the embodiment of the present disclosure. In addition, FIG. 5 shows: a single-phase voltage-type DC-to-AC converting device 11 that performs an autonomous parallel operation; an external single-phase AC voltage source 12 that is in parallel therewith; a coordination switch 15 that performs parallel connection or disconnection of the single-phase voltage-type DC-to-AC converting device 11 and the external single-phase AC voltage source 12. The external single-phase AC voltage source 12, for example, is a power system or a power generator.

The single-phase voltage-type DC-to-AC converting device 11 is a single-phase voltage-type DC-to-AC converting device that performs an autonomous parallel operation described in JP-A No. 09-028040. The output terminal voltage $V_1(t)$ of the single-phase voltage-type DC-to-AC converting device 11 that performs an independent unloaded operation is represented by the following equation.

[Math B1]

$$V_1(t) = \sqrt{2} V_i \cdot \sin \omega t \ [V] \qquad (1)$$

Here, $V_i$ is the effective value of the voltage and $\omega_i$ is the target-source angular frequency of the single-phase voltage-type DC-to-AC converting device 11. The effective value $V_i$ and the phase angle $\omega t = \theta_i$ represents an upper command vector 120 that is formed by the 1st-axis voltage command value $V_1^*(t)$ and the 2nd-axis voltage command value $V_2^*(t)$ and are determined as follows.

[Math B2]

$$V_i = \frac{E_{co} + K_{mu1} \cdot V_1^*}{1 + K_{mu1}} \qquad (2)$$

$$\frac{d\theta_i}{dt} = \omega_{co} + \frac{2\sqrt{2} \pi \cdot K_f \cdot K_{mu2}}{1 + \frac{\sqrt{2} \pi^2 \cdot K_f \cdot (1 - K_{mu2}) V_i}{2\omega_{co}}} \cdot V_2^*$$

Here, $E_{co}$ is a reference voltage, $K_{mu1}$ is the 1st-axis voltage gain, $K_{mu2}$ is the 2nd-axis voltage gain, and $K_f$ is a phase locked loop (PLL) gain.

Here, $\theta_i$ leads as the 2nd-axis voltage command value $V_2^*$ of the inverter increases, and lags as the 2nd-axis voltage command value $V_2^*$ of the inverter decreases. $V_i$ increases as the 1st-axis voltage command value $V_1^*$ is increased, and decreases as the 1st-axis voltage command value $V_1^*$ is decreased. In other words, the amplitude, the frequency, and the phase can be independently changed in accordance with $V_1^*$ and $V_2^*$.

In order to have the single-phase voltage-type DC-to-AC converting device 11 to be parallelized with the external single-phase AC voltage source 12, the following procedure is performed using the automatic synchronous parallelization apparatus 17.

[1] The automatic synchronous parallelization apparatus 17 adjusts the effective value $V_i(t)$ of the single-phase AC voltage of the single-phase voltage-type DC-to-AC converting device 11 to the effective value $V_s$ of the voltage of the external single-phase AC voltage source 12 by controlling the 1st-axis voltage command value $V_1^*(t)$.

The automatic synchronous parallelization apparatus 17 adjusts the single-phase AC voltage angular frequency $d\theta_i(t)/dt$ of the single-phase voltage-type DC-to-AC converting device 11 to a value $\omega_s + \Delta\omega_0$ that is shifted from the angular frequency $\omega_s$ of the external single-phase AC voltage source 12 by $\Delta\omega_0$, by controlling the 2nd-axis voltage command value $V_2^*(t)$. Here, $\Delta\omega_0 \neq 0$ rad/s. When $\Delta\omega_0 = 0$ rad/s, the automatic synchronous parallelization apparatus 17 cannot adjust the phase of the single-phase voltage-type DC-to-AC converting device 11 to that of the external single-phase AC voltage source 12. In addition, $\Delta\omega_0$ has a positive value in a case where the external single-phase AC voltage source 12 is an inverter, and has a negative value in a case where the external single-phase AC voltage source 12 is a rectifier. For example, $\Delta\omega_0 = 0.3$ rad/s (0.0478 Hz).

[3] When the effective value $V_i(t)$ of the signal-phase AC voltage of the single-phase voltage-type DC-to-AC converting device 11 is within a predetermined regulated range $\Delta V_s$ having the effective value of the voltage of the external single-phase AC voltage source 12 as its center, that is, $(V_s + \Delta V_s)$ and $\omega_s(t) - \theta_i(t)$ is in the range of $\pm \Delta \theta_i$, and the state continues for a predetermined time $T_{detect}$, the automatic synchronous parallelization apparatus 17 commands input of the switch 15. The values of $\Delta V_s$, $\Delta \theta_i$, and $T_{detect}$ will be described later.

As described above, in order to have the single-phase voltage-type DC-to-AC converting device 11 to be parallelized with the external single-phase AC voltage source 12, the automatic synchronous parallelization apparatus 17 is configured as below. The automatic synchronous parallelization apparatus 17 includes a synchronization detecting circuit 130, a voltage amplitude command value generating circuit 180, and a frequency command value generating circuit 190. The synchronization detecting circuit 130 detects a value $[(\omega_s-\omega)V_s$ or $(\omega_3-\omega)V_s^2]$ relating to a frequency difference between the external single-phase AC voltage source 12 that is in parallel with the single-phase voltage-type DC-to-AC converting device 11 that performs an autonomous parallel operation based on the 1st-axis voltage command value $V_1^*$ used for adjusting the amplitude of the output single-phase AC voltage and the 2nd-axis voltage command value $V_2^*$ used for adjusting the frequency and the single-phase voltage-type DC-to-AC converting device 11 and a value $[V_s$ or $V_s^2]$ relating to the effective value of the voltage of the external single-phase AC voltage source 12. The voltage amplitude command value generating circuit 180 generates the 1st-axis voltage command value $V_1^*$ at which the effective value $V_i$ of the single-phase AC voltage of the single-phase voltage-type DC-to-AC converting device 11 approaches the effective value $V_s$ of the voltage of the external single-phase AC voltage source 12 that is detected by the synchronization detecting circuit 130 and inputs the 1st-axis voltage command value $V_1^*$ to the single-phase voltage-type DC-to-AC converting device 11. The frequency command value generating circuit 190 generates the 2nd-axis voltage command value $V_2^*$ for which the frequency of the single-phase AC voltage of the single-phase voltage-type DC-to-AC converting device 11 is a frequency that is shifted from the frequency of the external single-phase AC voltage source 12 by an arbitrary frequency value $\Delta\omega_0$ by using the value relating to the frequency difference detected by the synchronization detecting circuit 130 and inputs the 2nd-axis voltage command value $V_2^*$ to the single-phase voltage-type DC-to-AC converting device 11.

The synchronization detecting circuit 130 that can detect the value $[(\omega_s-\omega_s)V_s$ or $(\omega_s-\omega)V_s^2]$ relating to a frequency difference between the external single-phase AC voltage source 12 and the single-phase voltage-type DC-to-AC converting device 11 and the value $[V_s$ or $V_s^2]$ relating to the effective value of the voltage of the external single-phase AC voltage source 12 may be used.

First, the principle of a synchronization test of the synchronization detecting circuit 130 will be described. FIG. 1 is a schematic diagram illustrating the synchronization test performed between a target-source single-phase AC voltage source 11 and a target single-phase AC voltage source 12. The target-source single-phase AC voltage source 11, for example, is a single-phase AC power source in which a synchronization detecting circuit is built such as an inverter that performs an autonomous parallel operation (APRun). The target single-phase AC voltage source 12, for example, is a power system or an external AC power source that is the other party for parallelization. When the AC-to-DC converter single-phase AC voltage source 11 performs an independent unloaded operation, the output terminal voltage $V_{fil}(t)$ is represented by the following equation.

[Math A5]

$$V_{fil}(t) = \sqrt{2} V_i \sin \omega t \ [V] \tag{5}$$

Here, $V_i$ is an effective value of the voltage of the target-source single-phase AC voltage source 11.

On the other hand, the voltage $V_{sys}(t)$ of the target single-phase AC voltage source 12 is represented by the following equation.

[Math A6]

$$V_{sys}(t) = \sqrt{2} V_s \sin(\omega_s t + \phi) \ [V] \tag{6}$$

Here, $V_s$ is an effective value [V], $\omega_s$ is an angular frequency [rad/s], and $\phi$ is a phase angle [rad] of the external AC power source at $t=0$, which is viewed from the inverter.

Now, a waveform $V^{\#}_{sys}(t)$ that lags by $\pi/(2\omega_{co})$ [s] with respect to $V_{sys}(t)$ will be considered. Here, $\omega_{co}$ is the reference angular frequency [rad/s] of the synchronization detecting circuit. Since $\omega_{co}$ cannot be determined to coincide with $\omega_s$, $V^{\#}_{sys}(t)$ cannot be determined to precisely lag by $\pi/2$ with respect to $V_{sys}(t)$

[Math A7]

$$V^{\#}_{sys}(t) \equiv V_{sys}\left(t - \frac{\pi}{2\omega_{co}}\right) \ [V] \tag{7}$$

$V^{\#}_{sys}(t)$ is transformed as follows.

[Math A8]

$$V^{\#}_{sys}(t) = \sqrt{2} V_s \sin\left(\omega_s t - \frac{\pi\omega_s}{2\omega_{co}} + \phi\right) \tag{8}$$

$$= -\sqrt{2} V_s \cos\left(\omega_s t + \phi + \frac{\pi(\omega_{co}-\omega_s)}{2\omega_{co}}\right) \ [V]$$

Here, rotating coordinate conversion is performed for $V_{sys}(t)$ and $V^{\#}_{sys}(t)$ as follows by using the phase angle $\theta_i$ ($=\omega t$) of the target-source single-phase AC voltage source. Through this rotational coordinate conversion, $V_{sys}(t)$ is rotated in the reverse direction of $\theta_i$.

[Math A9]

$$\begin{pmatrix} V_3(t) \\ V_4(t) \end{pmatrix} = \frac{1}{\sqrt{2}} \begin{pmatrix} \sin\theta_i & -\cos\theta_i \\ \cos\theta_i & \sin\theta_i \end{pmatrix} \begin{pmatrix} V_{sys}(t) \\ V^{\#}_{sys}(t) \end{pmatrix} \tag{9}$$

Here, $V_3(t)$ and $V_4(t)$ acquired through Mathematical Expression A9 are respectively called a frequency difference cosine signal and a frequency difference sine signal.

First, the frequency difference cosine signal $V_3(t)$ will be reviewed.

[Math A10]

$$V_3(t) = \frac{1}{\sqrt{2}} \{\sin\theta_i \cdot V_{sys}(t) - \cos\theta_i \cdot V^{\#}_{sys}(t)\} \tag{10}$$

$$= V_s \left\{ \sin\theta_i \cdot \sin(\omega_s t) + \cos\theta_i \cdot \cos\left(\omega_s t + \phi + \frac{\pi(\omega_{co}-\omega_s)}{2\omega_{co}}\right) \right\}$$

$$= V_s \cdot \cos(\omega_s t + \phi - \theta_i) - 2V_s \cdot \sin\left(\frac{\pi(\omega_{co}-\omega_s)}{4\omega_{co}}\right) \cdot \cos\theta_i \cdot$$

$$\sin\left(\omega_s t + \phi + \frac{\pi(\omega_{co}-\omega_s)}{4\omega_{co}}\right)$$

The second term of Mathematical Expression A10 can be transformed as follows.

[Math A11]

$$2V_s \cdot \sin\left(\frac{\pi(\omega_{co} - \omega_s)}{4\omega_{co}}\right) \cdot \cos\theta_i \cdot \sin\left(\omega_s t + \phi + \frac{\pi(\omega_{co} - \omega_s)}{4\omega_{co}}\right) = \quad (11)$$

$$V_s \cdot \sin\left(\frac{\pi(\omega_{co} - \omega_s)}{4\omega_{co}}\right) \times \left\{ \begin{array}{l} \sin\left(\omega_s t + \theta_i + \phi + \frac{\pi(\omega_{co} - \omega_s)}{4\omega_{co}}\right) - \\ \sin\left(\omega_s t - \theta_i + \phi + \frac{\pi(\omega_{co} - \omega_s)}{4\omega_{co}}\right) \end{array} \right\}$$

In Mathematical Expression A11, there are frequency components of frequencies corresponding to a sum of the frequency of the target-source single-phase AC voltage source and the frequency of the target single-phase AC voltage source and a difference between the frequencies, and the amplitudes thereof are as represented in Mathematical Expression A12.

[Math A12]

$$V_s \cdot \sin\left(\frac{\pi(\omega_{co} - \omega_s)}{4\omega_{co}}\right) \quad (12)$$

This amplitude decreases as the frequency of the target single-phase AC voltage source becomes closer to the reference frequency of the synchronization detecting circuit. For example, when the frequency of the target single-phase AC voltage source is 51 Hz, and the frequency of the reference frequency of the synchronization detecting circuit is 50 Hz, the value acquired in Mathematical Expression A12 is $0.0157V_s$ [V].

When the frequency component corresponding to the sum frequency, which is almost double the frequency, is eliminated from the waveform represented in Mathematical Expression A11 by using a low-pass filter, a waveform represented in Mathematical Expression A13 is acquired.

[Math A13]

$$-V_s \cdot \sin\left(\frac{\pi(\omega_{co} - \omega_s)}{4\omega_{co}}\right) \cdot \sin\left(\omega_s t - \theta_i + \phi + \frac{\pi(\omega_{co} - \omega_s)}{4\omega_{co}}\right) \quad (13)$$

Accordingly, when the waveform acquired by eliminating the component of the sum frequency from $V_3(t)$ is denoted by $V_{u3}(t)$, Mathematical Expression A14 is acquired.

[Math A14]

$$V_{U3}(t) = V_s \cdot \cos(\omega_s t + \phi - \theta_i) - V_s \cdot \sin\left(\frac{\pi(\omega_{co} - \omega_s)}{4\omega_{co}}\right) \cdot \quad (14)$$

$$\sin\left(\omega_s t - \theta_i + \phi + \frac{\pi(\omega_{co} - \omega_s)}{4\omega_{co}}\right)$$

$$= V_s \cdot \frac{\cos\left(\frac{\pi(\omega_{co} - \omega_s)}{4\omega_{co}}\right)}{\text{This part influences the amplitude.}}$$

$$\cos\left(\omega_s t - \theta_i + \phi + \frac{\frac{\pi(\omega_{co} - \omega_s)}{4\omega_{co}}}{\text{This part corresponds to the difference of the phase.}}\right)$$

From Mathematical Expression A14, $V_{u3}(t)$ is a cosine waveform having an amplitude of $V_s \cdot \cos(\pi(\omega_{co}-\omega_s)/(4\omega_{co}))$, a frequency of a difference between the target single-phase AC voltage source and the reference frequency of the synchronization detecting circuit, and an initial phase (a phase at time t=0) of $\phi+(\pi(\omega_{co}-\omega_s)/(4\omega_{co}))$. As an example, when $\omega_{co}=100\pi$ [rad/s] (50 Hz) and $\omega s=102\pi$ [rad/s] (51 Hz), the amplitude is $0.99988\ V_s$ [V], the frequency is 1 Hz, and the initial phase is $\phi_s+0.9$ [deg].

When $\omega_s$ is close to $\omega_{co}$, $V_{u3}(t)$ is approximately the same as the following value.

[Math A15]

$$V_{U3}(t) \approx V_s \cdot \cos(\omega_s t + \phi - \theta_i) \quad (15)$$

Next, the frequency difference sine signal $V_4(t)$ will be reviewed.

[Math A16]

$$V_4(t) = \frac{1}{\sqrt{2}} \{\cos\theta_i \cdot V_{sys}(t) + \sin\theta_i \cdot V_{sys}^\#(t)\} \quad (16)$$

$$= V_s \left\{ \cos\theta_i \cdot \sin(\omega_s t + \phi) - \sin\theta_i \cdot \cos\left(\omega_s t + \phi + \frac{\pi(\omega_{co} - \omega_s)}{2\omega_{co}}\right) \right\}$$

$$= V_s \cdot \sin(\omega_s t + \phi - \theta_i) + 2V_s \cdot \sin\left(\frac{\pi(\omega_{co} - \omega_s)}{4\omega_{co}}\right) \cdot \sin\theta_i \cdot$$

$$\sin\left(\omega_s t + \phi + \frac{\pi(\omega_{co} - \omega_s)}{4\omega_{co}}\right)$$

The second term of Mathematical Expression A16 can be transformed as follows.

[Math A17]

$$2V_s \cdot \sin\left(\frac{\pi(\omega_{co} - \omega_s)}{4\omega_{co}}\right) \cdot \sin\theta_i \cdot \sin\left(\omega_s t + \phi + \frac{\pi(\omega_{co} - \omega_s)}{4\omega_{co}}\right) = \quad (17)$$

$$V_s \cdot \sin\left(\frac{\pi(\omega_{co} - \omega_s)}{4\omega_{co}}\right) \times \left\{ \begin{array}{l} \cos\left(\omega_s t - \theta_i + \phi + \frac{\pi(\omega_{co} - \omega_s)}{4\omega_{co}}\right) - \\ \cos\left(\omega_s t + \theta_i + \phi + \frac{\pi(\omega_{co} - \omega_s)}{4\omega_{co}}\right) \end{array} \right\}$$

In Mathematical Expression A17, there are frequency components of frequencies corresponding to a sum of the frequency of the target-source single-phase AC voltage source and the frequency of the target single-phase AC voltage source and a difference between the frequencies, and the amplitudes thereof are as represented in Mathematical Expression A18.

[Math A18]

$$V_s \cdot \sin\left(\frac{\pi(\omega_{co} - \omega_s)}{4\omega_{co}}\right) \quad (18)$$

The amplitude is the same as that of the frequency difference cosine signal $V_3(t)$ represented in Mathematical Expression A12.

When the frequency component corresponding to the sum frequency, which is almost double the frequency, is eliminated from the waveform represented in Mathematical Expression A17 by using a low-pass filter, a waveform represented in Mathematical Expression A19 is acquired.

[Math A19]

$$V_s \cdot \sin\left(\frac{\pi(\omega_{co} - \omega_s)}{4\omega_{co}}\right) \cdot \cos\left(\omega_s t - \theta_i + \phi + \frac{\pi(\omega_{co} - \omega_s)}{4\omega_{co}}\right) \quad (19)$$

Accordingly, when the waveform acquired by eliminating the component of the sum frequency from $V_4(t)$ is denoted by $V_{u4}(t)$, Mathematical Expression A20 is acquired.

[Math A20]

$$V_{U4}(t) = V_s \cdot \sin(\omega_s t + \phi - \theta_i) + \quad (20)$$

$$V_s \cdot \sin\left(\frac{\pi(\omega_{co} - \omega_s)}{4\omega_{co}}\right) \cdot \cos\left(\omega_s t - \theta_i + \phi + \frac{\pi(\omega_{co} - \omega_s)}{4\omega_{co}}\right)$$

$$= V_s \cdot \underbrace{\cos\left(\frac{\pi(\omega_{co} - \omega_s)}{4\omega_{co}}\right)}_{\text{This part influences the amplitude.}} \cdot$$

$$\sin\left(\omega_s t - \theta_i + \phi + \underbrace{\frac{\pi(\omega_{co} - \omega_s)}{4\omega_{co}}}_{\text{This part corresponds to the difference of the phase.}}\right)$$

From Mathematical Expression A20, similarly to $V_{u3}(t)$, $V_{u4}(t)$ is a sine waveform having an amplitude of $V_s \cdot \cos(\pi(\omega_{co} - \omega_{co})/(4\omega_{co}))$, a frequency of a difference between the target single-phase AC voltage source and the target-source single-phase AC voltage source, and an initial phase (a phase at time t=0) of $\phi + (\pi(\omega_{co} - \omega_s)/(4\omega_{co}))$.

When $\omega_s$ is close to $\omega_{co}$, $V_{u4}(t)$ is approximately the same as the following value.

[Math A21]

$$V_{U4}(t) \approx V_s \cdot \sin(\omega_s t + \phi - \theta_i) \quad (21)$$

Subsequently, a method of detecting synchronization between the target single-phase AC voltage source and the target-source single-phase AC voltage source using the frequency difference cosine signal $V_{u3}(t)$ and the frequency difference sine signal $V_{u4}(t)$ will be described. When $\{V_{u3}(t)\}^2 + \{V_{u3}(t)\}^2$ is calculated, Mathematical Expression A22 is acquired from Mathematical Expression A14 and Mathematical Expression A20.

[Math A22]

$$V_{U3}^2(t) + V_{U4}^2(t) = V_s^2 \cdot \cos^2\left(\frac{\pi(\omega_{co} - \omega_s)}{4\omega_{co}}\right) \quad (22)$$

For example, when the reference frequency of the synchronization detecting circuit is 50 Hz, and the frequency of the target single-phase AC voltage source is 49 Hz, Mathematical Expression A23 is acquired.

[Math A23]

$$\cos\left(\frac{\pi(\omega_{co} - \omega_s)}{4\omega_{co}}\right) = \cos 0.9° = 0.99988 \quad (23)$$

Generally, since the range of the frequency variation of a commercial power source is about ±0.2 Hz, and the magnitude of the target single-phase AC voltage source can be detected with precision.

Next, detection of a frequency difference will be described. Mathematical Expression A24 is calculated.

[Math A24]

$$V_{U3}(t) \cdot \frac{d \cdot V_{U4}}{dt}(t) + V_{U4} \cdot \frac{d \cdot V_{U3}}{dt}(t) = \quad (24)$$

$$\left(\omega_s - \frac{d\theta_i}{dt}\right) \cdot V_s^2 \cdot \cos^2\left(\frac{\pi(\omega_{co} - \omega_s)}{4\omega_{co}}\right)$$

By dividing Mathematical Expression A24 by Mathematical Expression A22, the frequency difference can be acquired.

[Math A25]

$$\frac{V_{U3}(t) \cdot \frac{d \cdot V_{U4}}{dt}(t) + V_{U4}(t) \cdot \frac{d \cdot V_{U3}}{dt}(t)}{V_{U3}^2(t) + V_{U4}^2(t)} = \omega_s - \omega \quad (25)$$

Figure 2:
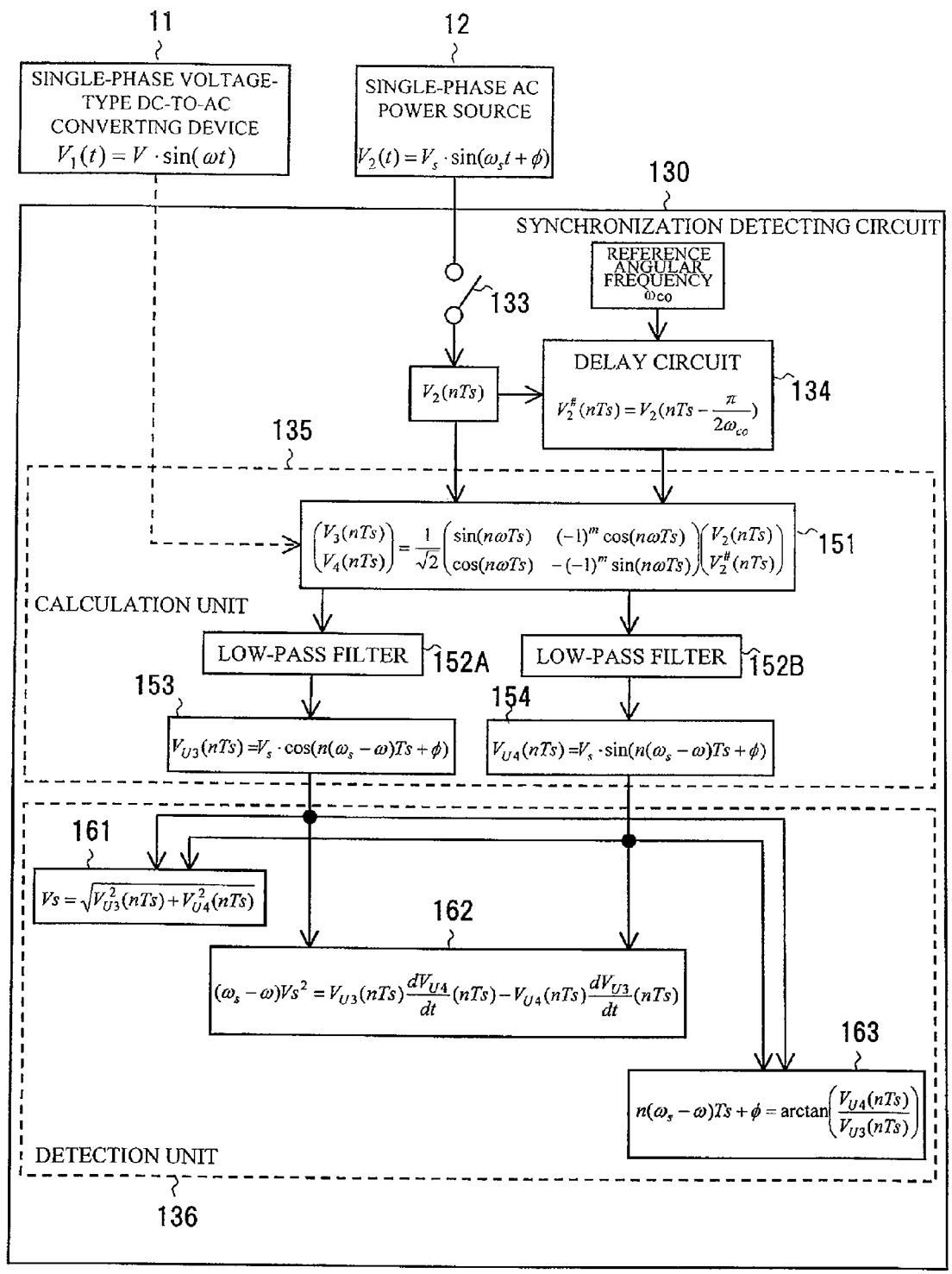
FIG. 2 is a schematic diagram illustrating a synchronization detecting circuit according to the present disclosure.

The description thereof will now be presented mode specifically. FIG. 2 is a schematic diagram illustrating the synchronization detecting circuit 130 of this embodiment. The synchronization detecting circuit 130 includes: a reference angular frequency $\omega_{co}$; a sampler 133 that detects the target voltage waveform of the target-target single-phase AC voltage source 12; a delay circuit 134 that generates a waveform of a delayed voltage, which is acquired by delaying the target voltage waveform by time $(m-\frac{1}{2})\pi/\omega_{co}$ (here, m is a natural number), detected by the sampler 133; and a calculation unit 135 that calculates a frequency difference cosine signal and a frequency difference sine signal that have an angular frequency of a difference between the target angular frequency $\omega_s$ of the target voltage waveform and the target-source angular frequency $\omega$, based on the target voltage waveform detected by the sampler 133, the waveform of the delayed voltage generated by the delay circuit 134, and the given target-source angular frequency $\omega$ of the single-phase AC voltage source 11.

In this embodiment, the synchronization detecting circuit 130 includes the reference angular frequency $\omega_{co}$. However, the reference angular frequency may be configured to be received from the target-source single-phase AC voltage source 11. In such a case, the target-source voltage waveform $V_1(t)$ of the single-phase AC voltage source 11 can be represented in the following equation.

[Math A26]

$$V_1(t)=V \cdot \sin(\omega_{co} \cdot t) \ [V] \quad (26)$$

In addition, the target voltage waveform $V_2(t)$ of the single-phase AC voltage source 12 that becomes a target can be represented in the following equation.

[Math A27]

$$V_2(t)=V_s \cdot \sin(\omega_s t + \phi) \ [V] \quad (27)$$

The sampler 133 samples the target voltage waveform $V_2(t)$. Here, a sample waveform acquired by sampling the target voltage waveform $V_2(t)$ is represented as $V_2(nTs)$. Here, Ts is a sampling period, and n is a sampling number.

The delay circuit 134 receives the reference angular frequency $\omega_{co}$ as input and generates a waveform of the delayed voltage $V_2^\#(nTs)$ acquired by delaying the sample waveform $V_2(nTs)$ by a period of $(m-\frac{1}{2})\pi/\omega_{co}$ (here, m is a natural number).

The delay amount of the waveform of the delayed voltage $V_2^\#(nTs)$ can be represented as $(m-\frac{1}{2})\pi/\omega_{co}$. In this embodiment, in the case of m=1 (a case of 1/4 period delay) will be described. In such a case, the waveform of the delayed voltage $V_2^\#(nTs)$ becomes the following equation.

[Math A28]

$$V_2^\#(nTs) = V_2\left(n\omega_s Ts - \frac{\pi}{2\omega_{co}}\right) \ [v] \quad (28)$$

The calculation unit 135 receives the target-source angular frequency $\omega$ as input from the single-phase AC voltage source 11. The calculation unit 135 receives the sample waveform $V_2(nTs)$ and the waveform of the delayed voltage $V_2^\#(nTs)$ as input and calculates a frequency difference cosine signal $V_3(nTs)$ and a frequency difference sine signal $V_4(nTs)$ that have an angular frequency of a difference between the target-source angular frequency $\omega$ and the target angular frequency $\omega_s$ of the single-phase AC voltage source 12.

More specifically, the calculation unit 135 calculates the frequency difference cosine signal $V_3(nTs)$ and the frequency difference sine signal $V_4(nTs)$ by performing rotating coordinate conversion for the sample waveform $V_2(nTs)$ and the waveform of the delayed voltage $V_2^\#(nTs)$, as represented in Mathematical Expression A1.

When being calculated by the calculation unit 135, the frequency difference cosine signal $V_3(nTs)$ and the frequency difference sine signal $V_4(nTs)$ include high frequency components of a frequency $(\omega_s+\omega)$. In addition, the calculation unit 135 further includes low pass filters (152A and 152B) that eliminate the high-frequency components. Here, the frequency difference cosine signal and the frequency difference sine signal from which the high-frequency components are eliminated by using the low-pass filters (152A and 152B) are respectively denoted as $V_{u3}(nTs)$ and $V_{u4}(nTs)$.

[Math A29]

$$V_{U3}(nTs)=V_s \cdot \cos(n(\omega_s-\omega)Ts+\phi)$$

$$V_{U4}(nTs)=V_s \cdot \sin(n(\omega_s-\omega)Ts+\phi) \quad (29)$$

The synchronization detecting circuit 130 further includes a detection unit 136. The detection unit 136 can detect an effective value of the target voltage waveform $V_2(t)$, a frequency difference between the target angular frequency $\omega_s$ of the target voltage waveform $V_2(t)$ and the target-source angular frequency $\omega$, and a phase difference between the target voltage waveform $V_2(t)$ and the target-source voltage waveform $V_1(t)$ by using the frequency difference cosine signal $V_{u3}(nTs)$ and the frequency difference sine signal $V_{u4}(nTs)$ output by the calculation unit 135.

More specifically, the detection unit 136 detects the effective value of the voltage, the frequency difference, and the phase difference by using a circuit 161 that calculates Mathematical Expression A2, a circuit 162 that calculates Mathematical Expression A3, and a circuit 163 that calculates Mathematical Expression A4. The synchronization detecting circuit 130 may input information of the effective value of the voltage, the frequency difference, and the phase difference, which have been detected, to the single-phase AC voltage source 11. The single-phase AC voltage source 11 can adjust the voltage amplitude value V, the target-source angular frequency $\omega$, and the phase of the target-source voltage waveform V1(t) so as to coincide with the voltage amplitude value $V_s$, the target angular frequency $\omega_s$, and the phase $\phi$ of the single-phase AC voltage source 12, based on the above-described information. Thus, by using the synchronization detecting circuit 130, the single-phase AC voltage source 11 can be connected to the single-phase AC voltage source 12 by being synchronized to the signal-phase AC voltage source 12.

In this embodiment, the synchronization detecting circuit 130 has been described to be arranged outside the single-phase AC voltage source 11. However, the single-phase AC voltage source 11 may have the synchronization detecting circuit 130 built therein.

In addition, in this embodiment, the delay time of the delay circuit 134 has been described as $(m-\frac{1}{2})\pi/\omega_{co}$. However, even in a case where the delay time is an arbitrary period other than an m period and an $(m-\frac{1}{2})$ period, the same advantages can be acquired. More specifically, the delay circuit 134 generates the waveform of the delayed voltage $V_2^\#(nTs)$ by delaying the sample waveform $V_2(nTs)$ by a period other than a $(2m-1)/2$ period and the m period. For example, the waveform of the delayed voltage $V_2^\#(nTs)$ may have a delay of a 1/6 period, a 2/6 period, a 4/6 period, a 5/6 period, ..., or a p/6 period (here, p is a natural number that is not a multiple number of three). In addition, the waveform of the delayed voltage $V_2^\#(nTs)$ may have a delay of a 1/4 period, a 3/4 period, ..., or a q/4 period (here, q is an odd number).

In addition, the coefficient of the matrix represented in Mathematical Expression A1 has been described as $1/\sqrt{2}$. However, the coefficient may be an arbitrary number other than zero.

Example of Synchronization Detecting Circuit

Figure 3:
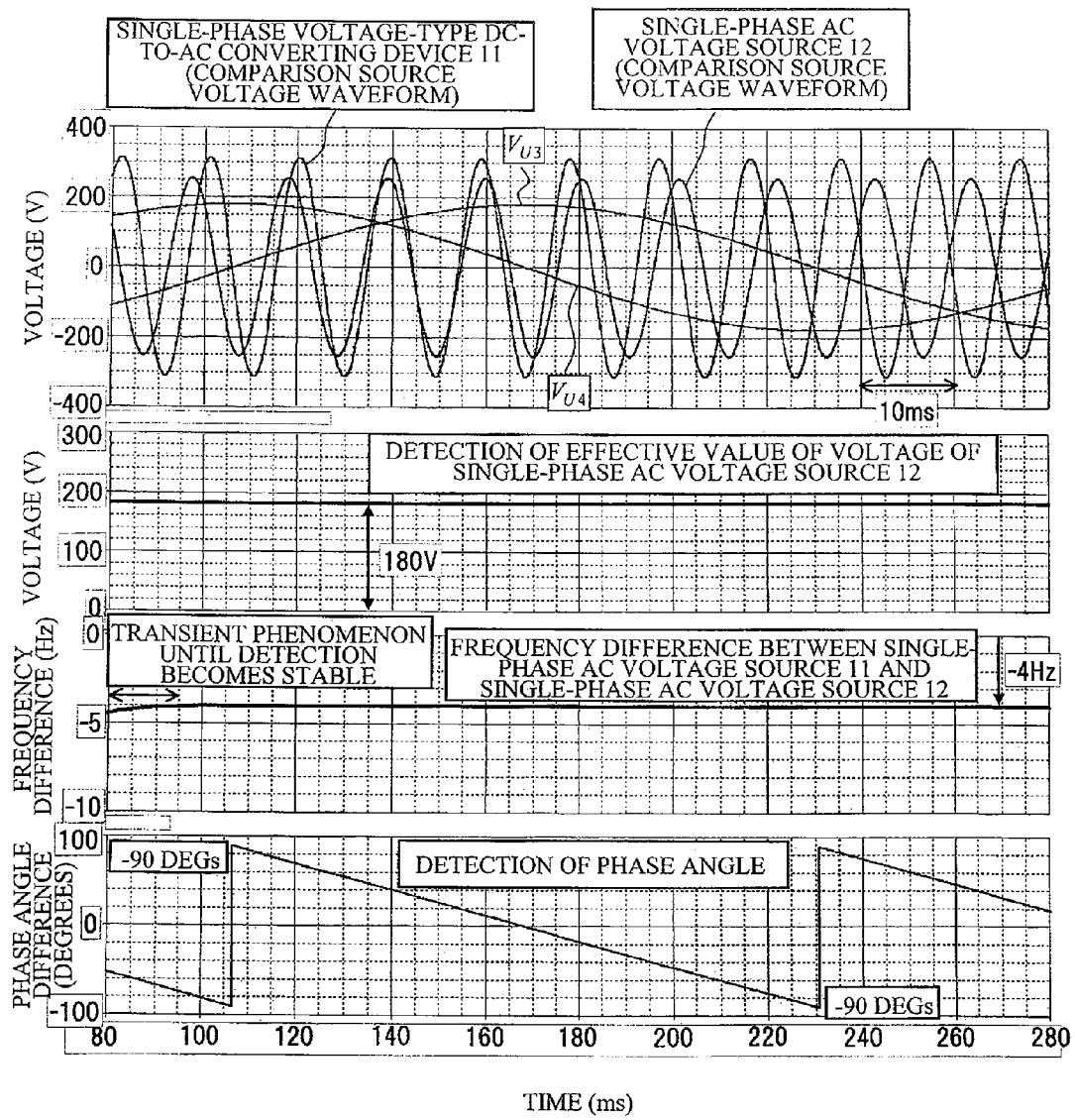
FIG. 3 is a result of simulating the operation of a synchronization detecting circuit according to the present disclosure.
Figure 4:
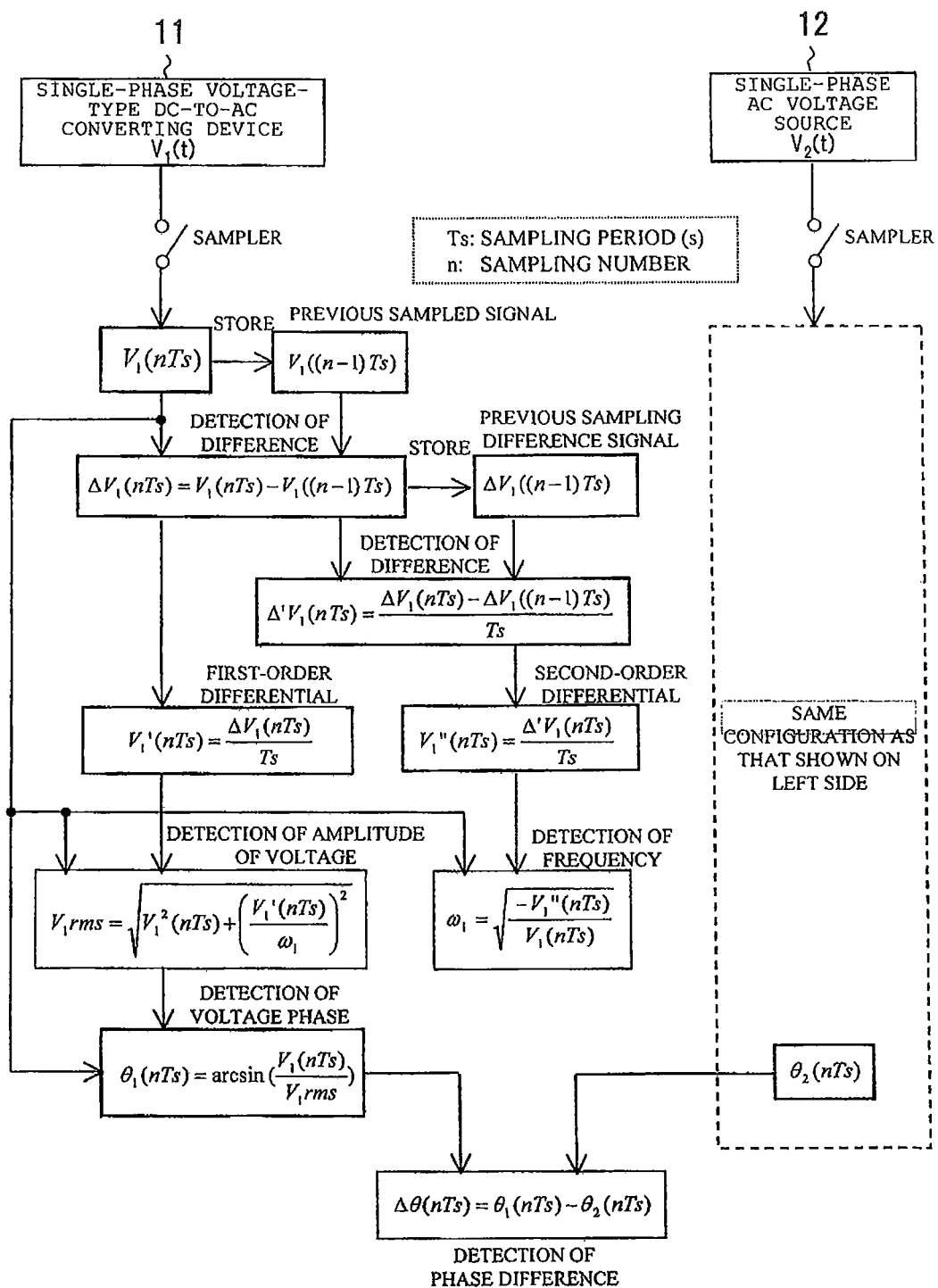
FIG. 4 is a schematic diagram illustrating a general synchronization detecting circuit.

FIG. 3 is a result of simulating a detection of the voltage amplitude $V_s$ of the single-phase AC voltage source 12, a frequency difference between the single-phase AC voltage source 11 and the single-phase AC voltage source 12, and a phase difference therebetween that is performed by the synchronization detecting circuit 130. The reference frequency of the synchronization detecting circuit was set to 50 Hz ($\omega_{co}=100\pi$ rad/s). It is assumed that the single-phase AC voltage source 11 is operated at 220 V and 52 Hz. In addition, it is assumed that the single-phase AC voltage source 12 is operated at 180 V ($V_s$) and 48 Hz ($\omega_{co}=96\pi$ rad/s).

The frequency difference cosine signals $V_{u3}(nTs)$ and $V_{u4}(nTs)$ that are generated based on the target voltage waveform $V_2(t)$ of the single-phase AC voltage source 12 and a waveform of the delayed voltage $V_2^\#(t)$ acquired by delaying the target voltage waveform by a 0.25 cycle have an amplitude of 180 V (the effective value of the voltage of the single-phase AC voltage source 12) and a frequency of 4 Hz (a frequency of a difference between the frequency of the target-source voltage waveform and the frequency of the target voltage waveform).

The detection unit 136 detects the effective value of the voltage as 180V, which is the same as that of the single-phase AC voltage source 12. In addition, the detection unit 136 detects a frequency difference as "−4 Hz," which is same as the set frequency difference (a frequency difference of the single-phase AC voltage source 12 with respect to the single-phase AC voltage source 11) between the single-phase AC voltage source 11 and the single-phase AC voltage source 12. Furthermore, the detection unit 136 detects a phase difference that is generated based on the frequency difference.

As described in this example, the synchronization detecting circuit 130 can precisely detect the effective value of the voltage of the single-phase AC voltage source 12, the frequency difference between the single-phase AC voltage source 11 and the single-phase AC voltage source 12, and the phase difference between the single-phase AC voltage source 11 and the single-phase AC voltage source 12.

FIG. 2 is a schematic diagram illustrating the synchronization detecting circuit 130. The synchronization detecting circuit 130 includes: a reference angular frequency $\omega_{co}$; a sampler 133 that detects the target voltage waveform of the external single-phase AC voltage source 12; a delay circuit 134 that generates a waveform of the delayed voltage, which is acquired by delaying the target voltage waveform by time $(m-\frac{1}{2})\pi/\omega_{co}$ (here, m is a natural number), detected by the sampler 133; and a calculation unit 135 that calculates a frequency difference cosine signal and a frequency difference sine signal that have an angular frequency of a difference between the target angular frequency $\omega_s$ of the target external voltage waveform and the target-source angular frequency $\omega$, based on the target external voltage waveform detected by the sampler 133, the waveform generated by the delay circuit 134, and the given the angular frequency $\omega$ of the single-phase voltage-type DC-to-AC converting device 11.

In this embodiment, the synchronization detecting circuit 130 includes the reference angular frequency $\omega_{co}$. However, the reference angular frequency may be configured to be received from the test-source single-phase voltage-type DC-to-AC converting device 11.

In addition, the target voltage waveform $V_2(t)$ of the external single-phase AC voltage source 12 that becomes a target can be represented in the following equation.

[Math B3]

$$V_2(t) = V_s \cdot \sin(\omega_s t + \phi) \ [V] \quad (3)$$

Here, $V_s$ is an effective value [V], $\omega_s$ is an angular frequency [rad/s], and $\phi$ is a phase angle [rad] of the external AC power source at t=0, which is viewed from the inverter.

The sampler 133 samples the target external voltage waveform $V_2(t)$. Here, a sample waveform acquired by sampling the target voltage waveform $V_2(t)$ is represented as $V_2(nTs)$. Here, Ts is a sampling period, and n is a sampling number.

The delay circuit 134 receives the reference angular frequency $\omega_{co}$ as input and generates a waveform of a delayed voltage $V_2^{\#}(nTs)$ acquired by delaying the sample waveform $V_2(nTs)$ by a period of $(m-\frac{1}{2})\pi/\omega_{co}$ (here, m is a natural number.

The delay amount of the waveform of the delayed voltage $V_2^{\#}(nTs)$ can be represented as $(m-\frac{1}{2})\pi/\omega_{co}$. In this embodiment, in the case of m=1 (a case of 1/4 period delay) will be described. In such a case, the waveform of the delayed voltage $V_2^{\#}(nTs)$ becomes the following equation.

[Math B4]

$$V_2^{\#}(nTs) = V_2\left(n\omega_s Ts - \frac{\pi}{2\omega_{co}}\right) \ [v] \quad (4)$$

The calculation unit 135 receives the target source angular frequency $\omega$ as input from the single-phase voltage-type DC-to-AC converting device 11. The calculation unit 135 receives the sample waveform $V_2(nTs)$ and the waveform of the delayed voltage $V_2^{\#}(nTs)$ as input and calculates a frequency difference cosine signal $V_3(nTs)$ and a frequency difference sine signal $V_4(nTs)$ that have an angular frequency of a difference between the target-source angular frequency $\omega$ and the target angular frequency $\omega_s$ of the external single-phase AC voltage source 12.

More specifically, the rotational coordinate conversion circuit 151 in the calculation unit 135 calculates the frequency difference cosine signal $V_3(nTs)$ and the frequency difference sine signal $V_4(nTs)$ by performing rotating coordinate conversion for the sample waveform $V_2(nTs)$ and the waveform of the delayed voltage $V_2^{\#}(nTs)$, as represented in Mathematical Expression B5.

[Math B5]

$$\begin{pmatrix} V_3(nTs) \\ V_4(nTs) \end{pmatrix} = \frac{1}{\sqrt{2}} \begin{pmatrix} \sin(n\omega Ts) & (-1)^m \cos(n\omega Ts) \\ \cos(n\omega Ts) & -(-1)^m \sin(n\omega Ts) \end{pmatrix} \begin{pmatrix} V_2(nTs) \\ V_2^{\#}(nTs) \end{pmatrix} \quad (5)$$

When being calculated by the calculation unit 135, the frequency difference cosine signal $V_3(nTs)$ and the frequency difference sine signal $V_4(nTs)$ include high frequency components of a frequency $(\omega_s+\omega)$. In addition, the calculation unit 135 further includes low pass filters (152A and 152B) that eliminate the high-frequency components. Here, the frequency difference cosine signal and the frequency difference sine signal from which the high-frequency components are eliminated by using the low-pass filters (152A and 152B) are respectively denoted as $V_{u3}(nTs)$ and $V_{u4}(nTs)$. Frequency difference cosine signal output terminal 153 and frequency difference sine signal output terminal 154 output $V_{u3}(nTs)$ and $V_{u4}(nTs)$ respectively.

[Math B6]

$$V_{U3}(nTs) = V_s \cdot \cos(n(\omega_s - \omega)Ts + \phi)$$

$$V_{U4}(nTs) = V_s \cdot \sin(n(\omega_s - \omega)Ts + \phi) \quad (6)$$

The synchronization detecting circuit 130 further includes a detection unit 136. The detection unit 136 can detect an effective value of the voltage of the target external voltage waveform $V_2(t)$, a frequency difference between the target angular frequency $\omega_s$ of the target external voltage waveform $V_2(t)$ and the target-source angular frequency $\omega$, and a phase difference between the target external voltage waveform $V_2(t)$ and the voltage waveform $V_1(t)$ by using the frequency difference cosine signal $V_{u3}(nTs)$ and the frequency difference sine signal $V_{u4}(nTs)$ output by the calculation unit 135.

More specifically, the detection unit 136 detects the effective value of the voltage, the frequency difference, and the phase difference by using a circuit 161 that calculates Mathematical Expression B7, a circuit 162 that calculates Mathematical Expression B8, and a circuit 163 that calculates Mathematical Expression B9.

[Math B7]
$$V_S = \sqrt{V_{U3}^2(nTs) + V_{U4}^2(nTs)} \quad (7)$$

[Math B8]
$$(\omega_s - \omega)V_s^2 = V_{U3}(nTs)\frac{dV_{U4}}{dt}(nTs) - V_{U4}(nTs)\frac{dV_{U3}}{dt}(nTs) \quad (8)$$

[Math B9]
$$n(\omega_s - \omega)Ts + \phi = \arctan\left(\frac{V_{U4}(nTs)}{V_{U3}(nTs)}\right) \quad (9)$$

Next, a procedure [1] for having the single-phase voltage-type DC-to-AC converting device 11 to be in parallel with the external single-phase AC voltage source 12 will be described. The procedure [1] is performed by the voltage amplitude command value generating circuit 180. The voltage amplitude command value generating circuit 180 includes: a voltage system subtractor 181 that subtracts a value [$V_i$ or $V_i^2$] relating to the effective value of the voltage of the single-phase AC voltage that is output by the single-phase voltage-type DC-to-AC converting device 11 from the a value [$V_s$ or $V_s^2$] relating to the effective value of the voltage of the external single-phase AC voltage source 12 that is detected by the synchronization detecting circuit 130; a voltage system integrator 182 that integrates a value acquired through subtraction of the voltage system subtractor 181; and a voltage system adder 183 that generates the 1st-axis voltage command value $V_1^*(t)$ by adding the initial voltage value $V_1^*(0)$ of the single-phase AC voltage of the single-phase voltage-type DC-to-AC converting device 11 immediately prior to the start of automatic parallel control with the external single-phase AC voltage source 12 and the value integrated by the voltage system integrator 182.

As in the following equation, "$V_{u3}^2(t)+V_{u4}^2(t)$" is almost the same as $V_s^2$.

[Math B10]
$$V_{U3}^2(t)+V_{U4}^2(t) \approx V_s^2 \quad (10)$$

By using the equation presented above, the following closed looping is applied for the 1st-axis voltage command value $V_1^*(t)$ of the single-phase voltage-type DC-to-AC converting device 11.

[Math B11]
$$V_1^*(t) = V_1^*(0) + K_{amp}\int_0^t \{(V_{U3}^2(t) + V_{U4}^2(t)) - V_i^2(t)\}dt \quad (11)$$

Here, the initial value $V_1^*(0)$ is a value of the $V_1^*(t)$ immediately prior to the start of the closed looping control, and $K_{amp}$ (>0) is an integral gain.

From Mathematical Expression B10, Mathematical Expression B11 can be approximated as follows.

[Math B12]
$$V_1^*(t) = V_1^*(0) + K_{amp}\int_0^t (V_s^2 - V_i^2(t))dt \quad (12)$$

By using Mathematical Expression B2, Mathematical Expression B12 is transformed into an equation of $V_i(t)$.

[Math B13]
$$\frac{(1 + K_{mul})V_i(t) - E_{co}}{K_{mul}} = V_1^*(0) + K_{amp}\int_0^t (V_s^2 - V_i^2(t))dt \quad (13)$$

[Math B14]
$$V_i(t) = V_i(0) + \frac{K_{mul} \cdot K_{amp}}{1 + K_{mul}}\int_0^t (V_s^2 - V_i^2(t))dt \quad (14)$$

However, as $V_i(0)=(E_{co}+K_{mu1}\cdot V_1^*(0))/(1+Km_{u1})$, $V_1(0)$ is the effective value of the voltage of the single-phase voltage-type DC-to-AC converting device 11 immediately prior to the start of automatic parallel control.

By differentiating both sides of Mathematical Expression B14, the following differential equation with respect to $V_i$ is acquired.

[Math B15]
$$\frac{d}{dt}V_i(t) = \frac{K_{mul} \cdot K_{amp}}{1 + K_{mul}}(V_s^2 - V_i^2(t)) \quad (15)$$

By transforming Mathematical Expression B15, the following equation is acquired.

[Math B16]
$$\left(\frac{1}{V_s + V_i(t)} + \frac{1}{V_s - V_i(t)}\right)\frac{d}{dt}V_i(t) = 2 \cdot \frac{K_{mul} \cdot K_{amp}}{1 + K_{mul}}V_s \quad (16)$$

By additionally using an integral coefficient C, Mathematical Expression B17 is acquired.

[Math B17]
$$\frac{V_s + V_i(t)}{V_s - V_i(t)} = C \cdot \exp\left(2 \cdot \frac{K_{mul} \cdot K_{amp}}{1 + K_{mul}}V_s \cdot t\right) \quad (17)$$

Accordingly, Mathematical Expression B18 is acquired.

[Math B18]
$$V_i(t) = \frac{C - \exp\left(-2 \cdot \frac{K_{mul} \cdot K_{amp}}{1 + K_{mul}}V_s \cdot t\right)}{C + \exp\left(-2 \cdot \frac{K_{mul} \cdot K_{amp}}{1 + K_{mul}}V_s \cdot t\right)} \cdot V_s \quad (18)$$

By transforming this, the following equation is acquired.

[Math B19]
$$V_i(t) = \frac{V_s + V_i(0) - (V_s - V_i(0))\cdot\exp\left(-2\cdot\frac{K_{mul}\cdot K_{amp}}{1+K_{mul}}V_s\cdot t\right)}{V_s + V_i(0) + (V_s - V_i(0))\cdot\exp\left(-2\cdot\frac{K_{mul}\cdot K_{amp}}{1+K_{mul}}V_s\cdot t\right)} \cdot V_s \quad (19)$$

From Mathematical Expression B19, Mathematical Expression B20 can be acquired.

[Math B20]

$$\lim_{t \to +\infty} V_i(t) = V_s \quad (20)$$

Accordingly, through the closed looping control, the effective value of the voltage of the output of the single-phase voltage-type DC-to-AC converting device 11 becomes close to $V_s$ as time elapses.

Subsequently, a procedure [2] for having the single-phase voltage-type DC-to-AC converting device 11 to be parallelized with the external single-phase AC voltage source 12 will be described. The procedure [2] is performed by the frequency command value generating circuit 190. The frequency command value generating circuit 190 includes: a frequency system calculator 191 that adds a value [$(\omega_s-\omega) \cdot V_s$ or $(\omega_s-\omega) \cdot V_s^2$] relating to a frequency difference detected by the synchronization detecting circuit 130 to a value acquired by multiplying a value [$V_s$ or $V_s^2$] relating to the effective value of the voltage of the external single-phase AC voltage source 12 detected by the synchronization detecting circuit 130 by an arbitrary frequency value $\Delta\omega_o$; a frequency system integrator 192 that integrates the value calculated by the frequency system calculator 191; and a frequency system adder 193 that generates the 2nd-axis voltage command value $V_2^*(t)$ by adding the initial frequency value $V_2^*(0)$ of the single-phase AC voltage of the single-phase voltage-type DC-to-AC converting device 11 immediately prior to the start of automatic parallel control with the external single-phase AC voltage source 12 and the value integrated by the frequency system integrator 192.

Here, approximation can be performed as the following equation.

[Math B21]

$$V_{U3}(t) \cdot \frac{d}{dt}V_{U4}(t) - V_{U4}(t) \cdot \frac{d}{dt}V_{U3}(t) \approx V_s^2\left(\omega_s - \frac{d\theta_i}{dt}\right) \quad (21)$$

By using the equation presented above, the following closed looping is applied for the 2nd-axis voltage command value $V_2^*(t)$ of the single-phase voltage-type DC-to-AC converting device 11.

[Math B22]

$$V_2^*(t) = V_2^*(0) + K_{freq} \int_0^t \left\{V_0^2 \Delta\omega_0 + \left(\begin{array}{c} V_{U3}(t) \cdot \frac{d}{dt}V_{U4}(t) - \\ V_{U4}(t) \cdot \frac{d}{dt}V_{U3}(t) \end{array}\right)\right\} dt$$

$$= V_2^*(0) + K_{freq} \cdot V_s^2 \int_0^t \left(\Delta\omega_0 + \omega_s - \frac{d\theta_i}{dt}\right) dt \quad (22)$$

Here, the initial value $V_2^*(0)$ is a value of the $V_2^*(t)$ immediately prior to the start of the closed looping control, and $K_{freq}$ (>0) is an integral gain. The value of $V_s^2$ that is multiplied by $\Delta\omega_0$ is acquired by using Mathematical Expression B10. $V_s^2$ may be substituted with $E_{co}^2$.

By differentiating both sides of Mathematical Expression B22, the following equation can be acquired.

[Math B23]

$$\frac{d}{dt}V_2^*(t) = K_{freq} \cdot V_s^2 \cdot \left(\Delta\omega_0 + \omega_s - \frac{d\theta_i}{dt}\right) \quad (23)$$

Here, when the angular frequency of the output of the single-phase voltage-type DC-to-AC converting device 11 is denoted by $\omega_i(t)$, Mathematical Expression B24 is acquired.

[Math B24]

$$\omega_i(t) = \frac{d}{dt}\theta_i(t) \text{ [rad/s]} \quad (24)$$

From Mathematical Expression B2, Mathematical Expression B25 is acquired.

[Math B25]

$$\frac{d}{dt}\omega_i(t) = A \cdot \frac{d}{dt}V_2^*(t) \quad (25)$$

$$A = \frac{2\sqrt{2}\pi \cdot K_f K_{mu2}}{1 + \frac{\sqrt{2}\pi^2 \cdot K_f(1 - K_{mu2}) \cdot V_i}{2\omega_{co}}}$$

When Mathematical Expression B25 is substituted in Mathematical Expression B23, $\omega_i(t)$ is acquired as follows from a differential equation with respect to $\omega_i$.

[Math B26]

$$\frac{d}{dt}\omega_i(t) = A \cdot K_{freq} \cdot V_s^2 \cdot (\Delta\omega_0 + \omega_s - \omega_i(t)) \quad (26)$$

$$\omega_i(t) = \Delta\omega_0 + \omega_s + (\omega_i(0) - \Delta\omega_0 - \omega_s) \cdot \exp(-A \cdot K_{freq} \cdot V_s^2 \cdot t)$$

Here, $\omega_i(0)$ is the value of $\omega_i(t)$ immediately before the start of closed looping.

[Math B27]

$$\lim_{t \to +\infty} \omega_i(t) = \omega_s + \Delta\omega \quad (27)$$

Accordingly, the angular frequency of the output of the single-phase voltage-type DC-to-AC converting device 11 becomes close to $\omega_s+\Delta\omega_o$ in accordance with the closed looping control as time elapses.

Subsequently, a procedure [3] for having the single-phase voltage-type DC-to-AC converting device 11 to be parallelized with the external single-phase AC voltage source 12 will be described. When the effective value $V_i$ of the voltage and the frequency $\omega_i$ of the single-phase AC voltage waveform of the single-phase voltage-type DC-to-AC converting device 11 are respectively within predetermined regulated ranges having the effective value $V_s$ of the voltage and the frequency $\omega_s$ of the external single-phase AC voltage source 12 as the center thereof, the synchronization detecting circuit 130 connects the single-phase voltage-type DC-to-AC converting device 11 and the external single-phase AC voltage source 12 so as to be in parallel with each other by closing the coordination switch 15.

Figure 6:
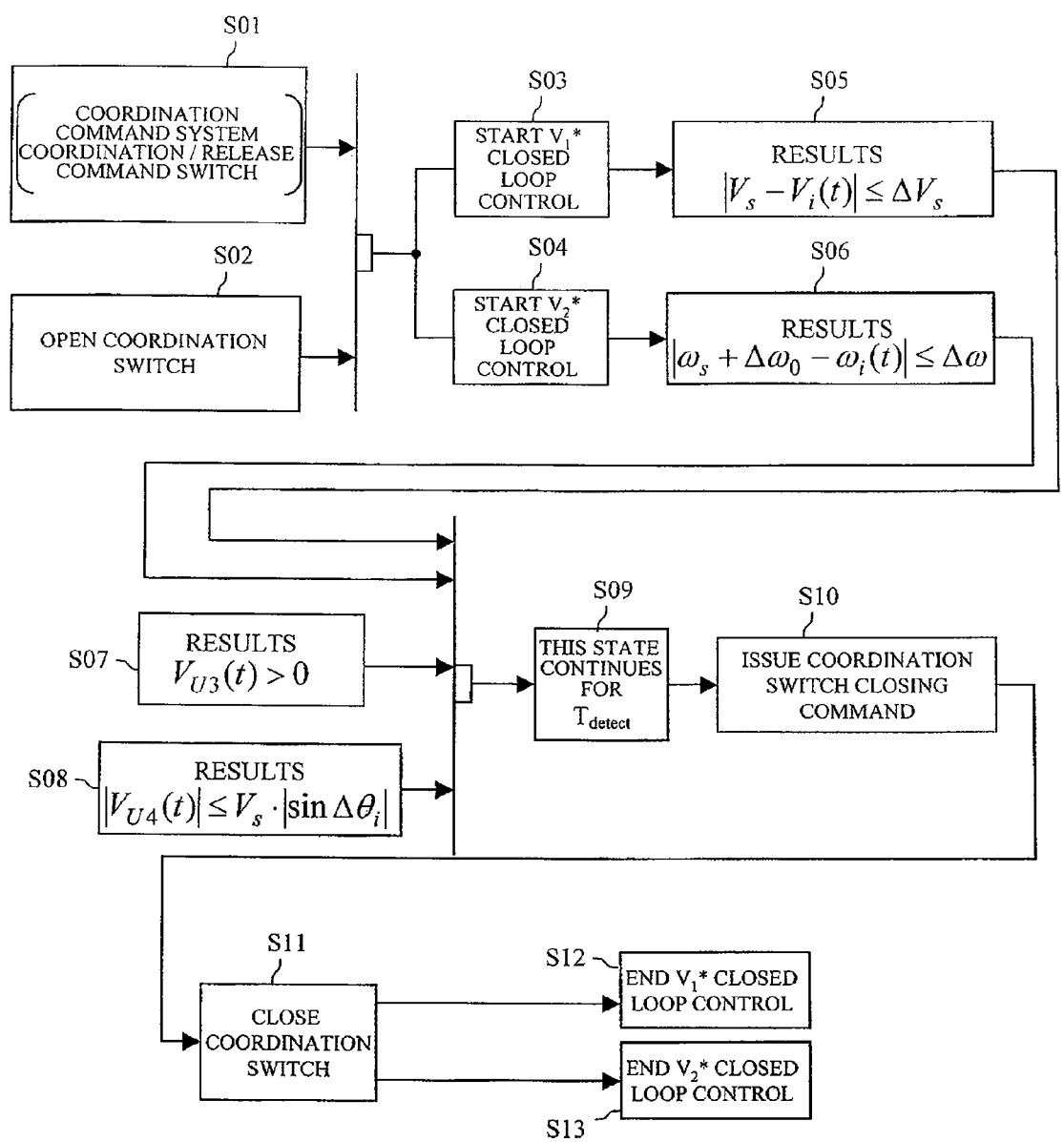
FIG. 6 is a diagram illustrating a logic for having a single-phase voltage-type DC-to-AC converting device to be in parallel with an external single-phase AC voltage source, which is performed by an automatic synchronous parallelization apparatus according to the present disclosure.

FIG. 6 is a diagram illustrating the logic for having the single-phase voltage-type DC-to-AC converting device 11 to be parallelized with the external single-phase AC voltage source 12, which is performed by the automatic synchronous parallelization apparatus 17. It is assumed that a parallelization command is issued (Step S01) when the coordination switch 15 is in an open state (Step S02). The automatic synchronous parallelization apparatus 17 starts $V_1^*$ closed looping and $V_2^*$ closed looping (Steps S03 and S04). The automatic synchronous parallelization apparatus 17 checks the following four conditions. The first condition is $|\oplus V_s - V_i(t)| \le \Delta V_s$ (Step S05). Here, $\Delta V_s$ represents an allowable amplitude difference and is, for example, about 5% of $V_s$. The second condition is $|\omega_s + \Delta \omega - \omega_i(t)| \le \Delta \omega$ (Step S06). Here, $\Delta \omega$ represents an allowable difference of the angular frequency and is, for example, about 1% of $\omega_s$. The third condition is that $V_{u3}(t)$ calculated by the synchronization detecting circuit 130 is greater than zero (Step S07). The fourth condition is $|V_{u4}(t)| \le V_s \cdot |\sin \Delta \theta_i|$, wherein $V_{u4}(t)$ is calculated by the synchronization detecting circuit 130 (Step S08). Here, $\Delta \theta_i$ represents an allowable phase difference and is, for example, about 5 degrees. After checking the above-described four conditions to be continuous during time $T_{detect}$ (Step S09), the automatic synchronous parallelization apparatus 17 issues a command for closing the coordination switch 15 (Step S10). When receiving the command, the coordination switch 15 is closed (Step S11). Thereafter, the automatic synchronous parallelization apparatus 17 completes the $V_1^*$ closed looping and the $V_2^*$ closed looping (Steps S12 and S13).

In addition, the condition used in Step S07 is equal to the condition of $\cos(\omega_s t - \theta_i(t)) > 0$. This is a condition for excluding a case where parallelization is made with a phase difference of 180° under the condition used in Step S08.

Figure 7:
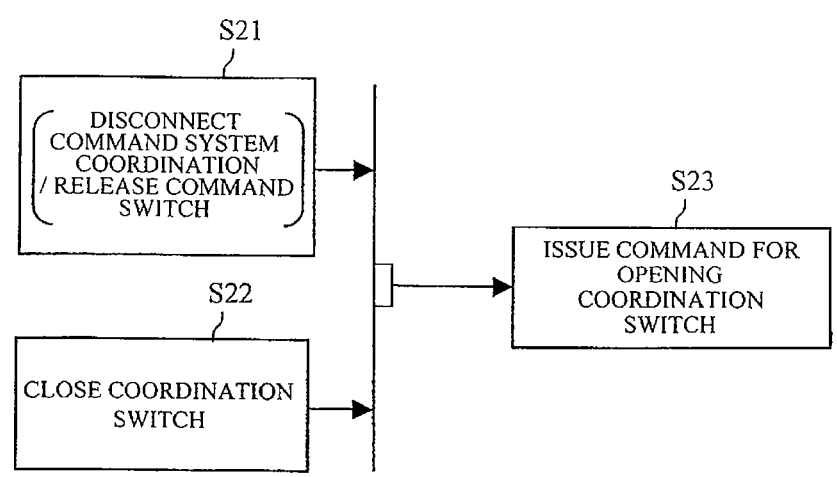
FIG. 7 is a diagram illustrating a logic for disconnecting a single-phase voltage-type DC-to-AC converting device from an external single-phase AC voltage source, which is performed by an automatic synchronous parallelization apparatus according to the present disclosure.

FIG. 7 is a diagram illustrating the logic for disconnecting the single-phase voltage-type DC-to-AC converting device 11 from the external single-phase AC voltage source 12, which is performed by the automatic synchronous parallelization apparatus 17. It is assumed that a disconnection command is issued (Step S21) when the coordination switch 15 is in a closed state (Step S22). The automatic synchronous parallelization apparatus 17 issues a command for opening the coordination switch 15 (Step S23). When receiving the command, the coordination switch 15 is open.

Example 1 of Automatic Synchronous Parallelization Apparatus

Figure 8:
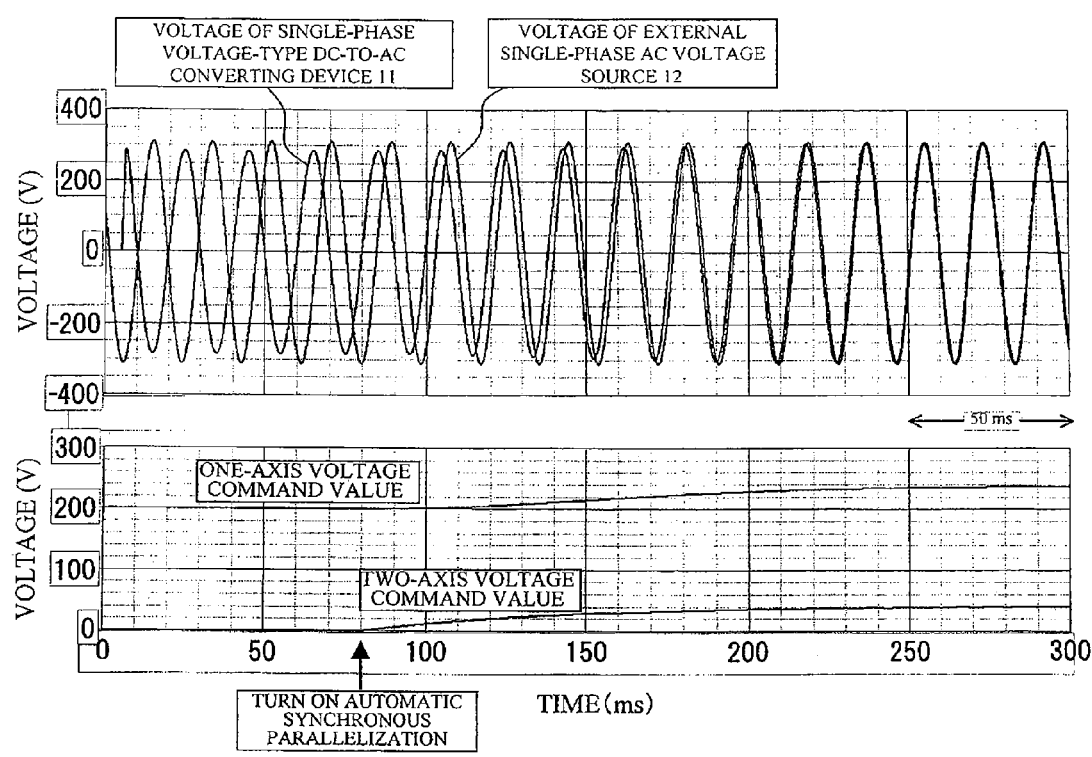
FIG. 8 is a result of simulating the 1st-axis voltage command value, the 2nd-axis voltage command value, and a single-phase voltage waveform of a single-phase voltage-type DC-to-AC converting device when an automatic synchronous parallelization apparatus according to the present disclosure connects the single-phase voltage-type DC-to-AC converting device to be in parallel with an external single-phase AC voltage source.

FIG. 8 is a result of simulating the 1st-axis voltage command value, the 2nd-axis voltage command value, and the single-phase voltage waveform of the single-phase voltage-type DC-to-AC converting device 11 when the automatic synchronous parallelization apparatus 17 connects the single-phase voltage-type DC-to-AC converting device 11 so as to be in parallel with the external single-phase AC voltage source 12.

It is assumed that the single-phase voltage-type DC-to-AC converting device 11 is operated at 200 V and 50 Hz before a parallelization process. In addition, it is assumed that the external single-phase AC voltage source 12 is operated at 220 V and 54 Hz. At time 80 ms, the coordination command (Step S01) represented in FIG. 6 was performed. Thereafter, the voltage waveform command value slowly increases from 200 V and becomes constant at 240 V (corresponding to an output voltage of 220 V). In accordance with the voltage waveform command value, the amplitude value of the signal-phase AC voltage of the single-phase voltage-type DC-to-AC converting device 11 becomes close to the amplitude value of the AC voltage waveform of the external single-phase AC voltage source 12. In addition, the 2nd-axis voltage command value also slowly increases from 0 V and becomes constant at 41.3 V. This voltage corresponds to the frequency of 54.05 Hz of the single-phase AC voltage waveform of the single-phase voltage-type DC-to-AC converting device 11.

As shown in FIG. 8, the magnitude and the frequency of the output voltage of the single-phase voltage-type DC-to-AC converting device 11 slowly becomes close to the voltage and the frequency of the external single-phase AC voltage source 12, and coincides therewith after about 150 ms. In other words, it takes about 150 ms for the single-phase AC voltage waveform of the single-phase voltage-type DC-to-AC converting device 11 to be synchronized with the voltage waveform of the external single-phase AC voltage source 12.

Example 2 of Automatic Synchronous Parallelization Apparatus

Figure 9:
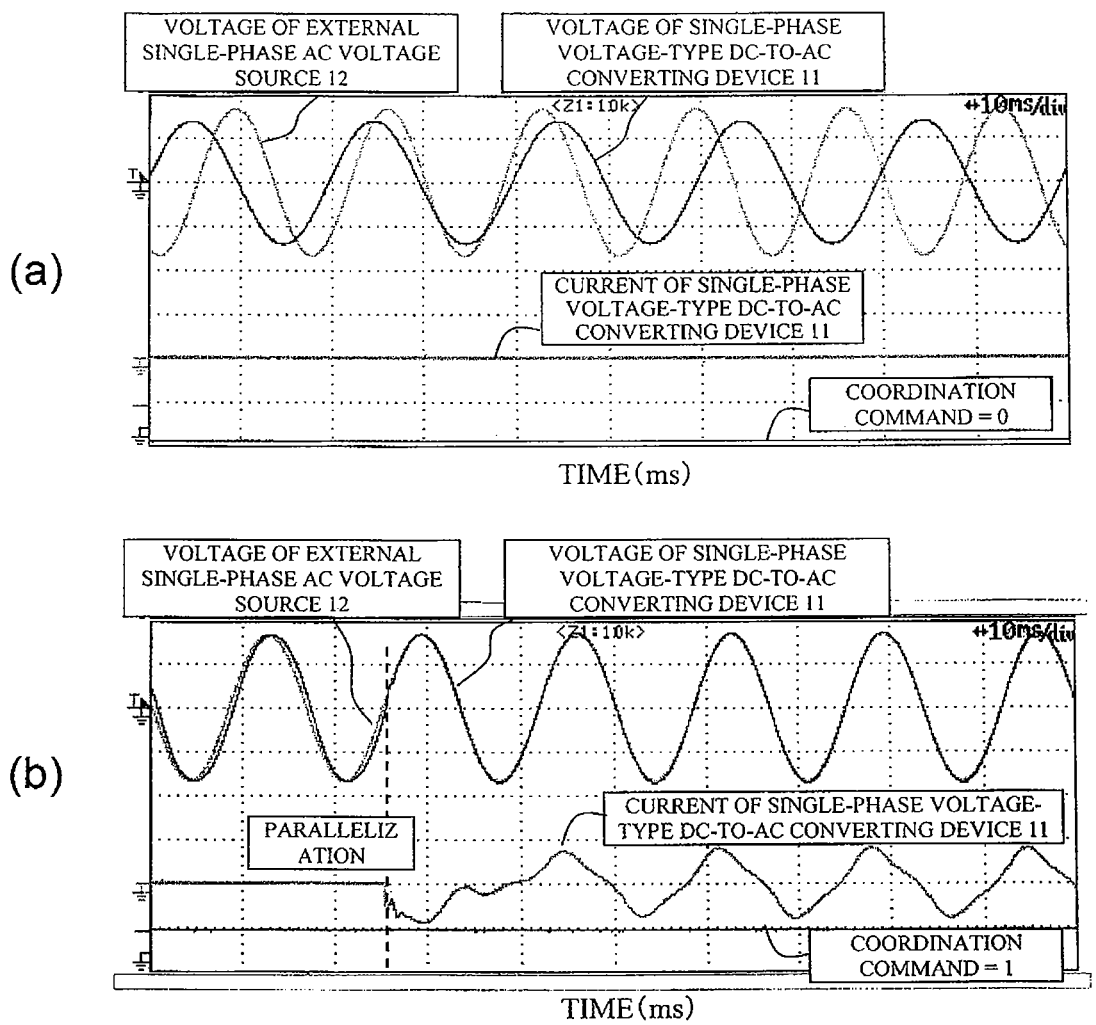
FIG. 9A is a result of measurement of a single-phase voltage waveform of a single-phase voltage-type DC-to-AC converting device, the voltage waveform of an external single-phase AC voltage source, and the output current of the single-phase voltage-type DC-to-AC converting device before the parallelization process.
FIG. 9B is a result of measurement of the single-phase voltage waveform of the single-phase voltage-type DC-to-AC converting device, the voltage waveform of the external single-phase AC voltage source, and the output current of the single-phase voltage-type DC-to-AC converting device after the parallelization process.

An experiment of having the single-phase voltage-type DC-to-AC converting device 11 to be parallelized with the external single-phase AC voltage source 12 by using the automatic synchronous parallelization apparatus 17 was performed. The single-phase voltage-type DC-to-AC converting device 11 was operated at 200 V and 50 Hz before the parallelization process. The external single-phase AC voltage source 12 was operated at 240 V and 60 Hz. FIGS. 9A and 9B are results of measurements of the single-phase voltage waveform of the single-phase voltage-type DC-to-AC converting device 11, the voltage waveform of the external single-phase AC voltage source 12, and the output current of the single-phase voltage-type DC-to-AC converting device 11 before and after the parallelization process in this experiment. FIG. 9A is a waveform before the parallelization process, and FIG. 9B is a waveform immediately before and after the parallelization process.

As shown in FIG. 9A, before the parallelization process, the single-phase voltage waveform of the single-phase voltage-type DC-to-AC converting device 11 and the voltage waveform of the external single-phase AC voltage source 12 are mismatched to each other. After the parallelization process is performed in accordance with the parallelization command with the single-phase voltage waveform of the single-phase voltage-type DC-to-AC converting device 11 and the voltage waveform of the external single-phase AC voltage source 12 being synchronized with each other, before the parallel connection, the single-phase voltage waveform of the single-phase voltage-type DC-to-AC converting device 11 and the voltage waveform of the external single-phase AC voltage source 12 coincide with each other. After the parallel connection, there is a distortion in the output current of the single-phase voltage-type DC-to-AC converting device 11. However, this is due to over-excitation due to application of 240 V to a 200 V transformer disposed on the input side of the external single-phase AC voltage source 12.

As above, the automatic synchronous parallelization apparatus 17 can have a single-phase voltage-type DC-to-AC converting device, which is controlled as a voltage source, to be parallelized with an external single-phase AC voltage source.

What is claimed is:
1. A synchronization detecting circuit comprising:
   a detection unit that detects a value relating to a frequency difference between an external single-phase AC voltage source that is a parallelization target of a single-phase voltage-type DC-to-AC converting device performing an autonomous parallel operation based on a 1st-axis voltage command value, which is used for adjusting an amplitude of an output single-phase AC voltage, and a 2nd-axis voltage command value, which is used for adjusting a frequency, and the single-phase voltage-type DC-to-AC converting device and a value relating to an effective value of a voltage of the external single-phase AC voltage source, wherein the detection unit comprises:

a sampler that detects a target voltage waveform of the external single-phase AC voltage source;

a delay circuit that generates a waveform of a delayed voltage that is delayed from a waveform of the target voltage detected by the sampler by time that is longer than $(m-1)\pi/\omega_{co}$ and shorter than $m\pi/\omega_{co}$ (here, m is a natural number and $\omega_{co}$ is a reference angular frequency); and a calculation unit that calculates a frequency difference cosine signal and a frequency difference sine signal that have an angular frequency corresponding to a difference between a target angular frequency of the waveform of the target voltage and a given target-source angular frequency of the single phase voltage-type DC-to-AC converting device, using the waveform of the target voltage, which is detected by the sampler, the waveform of the delayed voltage, which is generated by the delay circuit, and the given target-source angular frequency, wherein the value relating to the frequency difference and the value relating to the effective value of the voltage are detected based on the frequency difference cosine signal and the frequency difference sine signal that are calculated by the calculation unit.

2. The synchronization detecting circuit according to claim 1, wherein the delay circuit delays the waveform of a delayed voltage from the waveform of the target voltage by time of $(m-\frac{1}{2})\pi/\omega_{co}$.

3. The synchronization detecting circuit according to claim 1, wherein the calculation unit performs calculation of Mathematical Expression A1,

[Math A1]

$$\begin{pmatrix} V_3(nTs) \\ V_4(nTs) \end{pmatrix} = \frac{1}{\sqrt{2}} \begin{pmatrix} \sin(n\omega Ts) & (-1)^m \cos(n\omega Ts) \\ \cos(n\omega Ts) & -(-1)^m \sin(n\omega Ts) \end{pmatrix} \begin{pmatrix} V_2(nTs) \\ V_2^\#(nTs) \end{pmatrix} \quad (1)$$

wherein, $V_2(nTs)$ is the waveform of a target voltage, $V_2^\#(nTs)$ is the waveform of a delayed voltage, $V_3(nTs)$ is the frequency difference cosine signal, $V_4(nTs)$ is the frequency difference sine signal, n is a sampling number of the waveform of the target voltage detected by the sampler, Ts is a sample period, and $\omega$ is the target-source angular frequency, wherein $\omega$ is in a range of 75% to 125% of the reference angular frequency $\omega_{co}$.

4. The synchronization detecting circuit according to claim 1, further comprising:

a low-pass filter that eliminates high-frequency components of the frequency difference cosine signal and the frequency difference sine signal that are accumulated by the calculation unit.

5. The synchronization detecting circuit according to claim 1, further comprising:

a detection unit that detects an effective value of the target voltage as the value relating the effective value of the voltage, a frequency difference between the target angular frequency and the target-source angular frequency as the value relating to the frequency difference, and a phase difference between the target voltage and the target source voltage.

6. The synchronization detecting circuit according to claim 5, wherein the detection unit detects the effective value $V_s$ of the voltage, the frequency difference $\omega_s-\omega$, and the phase difference $\phi$ through Mathematical Expressions A2, A3, and A4,

[Math A2]

$$V_s = \sqrt{V_3^2(nTs) + V_4^2(nTs)} \quad (2)$$

wherein, $V_s$ is the effective value of the voltage,

[Math A3]

$$(\omega_s - \omega)V_s^2 = V_3(nTs)\frac{dV_4}{dt}(nTs) - V_4(nTs)\frac{dV_3}{dt}(nTs) \quad (3)$$

wherein, $\omega_s$ is the target angular frequency,

[Math A4]

$$n(\omega_s - \omega)Ts + \phi = \arctan\left(\frac{V_4(nTs)}{V_3(nTs)}\right). \quad (4)$$

7. An automatic synchronous parallelization apparatus comprising:

a synchronization detecting circuit comprising: a detection unit that detects a value relating to a frequency difference between an external single-phase AC voltage source that is a parallelization target of a single-phase voltage-type DC-to-AC converting device performing an autonomous parallel operation based on a 1st-axis voltage command value, which is used for adjusting an amplitude of an output single-phase AC voltage, and a 2nd-axis voltage command value, which is used for adjusting a frequency, and the single-phase voltage-type DC-to-AC converting device and a value relating to an effective value of a voltage of the external single-phase AC voltage source;

a voltage amplitude command value generating circuit that generates the 1st-axis voltage command value for which the effective value of the single-phase AC voltage of the single-phase voltage-type DC-to-AC converting device approaches an effective value of a voltage of the external single-phase AC voltage source by using the value relating to the effective value of the voltage that is detected by the synchronization detecting circuit and inputs the 1st-axis voltage command value to the single-phase voltage-type DC-to-AC converting device; and a frequency command value generating circuit that generates the 2nd-axis voltage command value for which the frequency of the single-phase AC voltage of the single-phase voltage-type DC-to-AC converting device becomes a frequency that is shifted from the frequency of the external single-phase AC voltage source by an arbitrary frequency by using the value relating to the frequency difference that is detected by the synchronization detecting circuit and inputs the 2nd-axis voltage command value to the single-phase voltage-type DC-to-AC converting device, wherein the voltage amplitude command value generating circuit comprises:

a voltage system subtractor that subtracts the value relating to the effective value of the single-phase AC voltage by the single-phase voltage-type DC-to-AC converting device from the effective value of the voltage of the external single-phase AC voltage source that is detected by the synchronization detecting circuit;

a voltage system integrator that integrates a value acquired through subtraction of the voltage system subtractor; and a voltage system adder that generates the 1st-axis voltage command value by adding an initial value of the single-phase AC voltage of the single-phase voltage-type DC-to-AC converting device prior to start of automatic parallelization control with the external single-phase AC voltage source and the value acquired through integration of the voltage system integrator.

8. The automatic synchronous parallelization apparatus according to claim 7, wherein the frequency command value generating circuit comprises:

a frequency system calculator that adds the value relating to the frequency difference detected by the synchronization detecting circuit to a value acquired by multiplying the effective value of the voltage of the external single-phase AC voltage source, which is detected by the synchronization detecting circuit, by the arbitrary frequency value; and a frequency system integrator that integrates a value acquired through calculation of the frequency system calculator; and a frequency system adder that generates the 2nd-axis voltage command value by adding an initial frequency of the single-phase AC voltage of the single-phase voltage-type DC-to-AC converting device prior to start of the automatic parallelization control with the external single-phase AC voltage source and the value acquired through integration of the frequency system integrator.

9. The automatic synchronous parallelization apparatus according to claim 7, wherein the value relating to the effective value of the voltage is a square of the effective value of the voltage.

10. The automatic synchronous parallelization apparatus according to claim 7, wherein the synchronization detecting circuit, when the effective value of the voltage and the frequency of the single-phase AC voltage waveform of the single-phase voltage-type DC-to-AC converting device are in predetermined regulated ranges having the effective value of the voltage and the frequency of the external single-phase AC voltage source used as centers thereof, has the single-phase voltage-type DC-to-AC converting device and the external single-phase AC voltage source so as to be in parallel with each other.

* * * * *